(12) United States Patent
Iwanami

(10) Patent No.: US 12,547,949 B2
(45) Date of Patent: Feb. 10, 2026

(54) INFORMATION PROCESSING SYSTEM AND CONTROL METHOD

(71) Applicant: SONY GROUP CORPORATION, Tokyo (JP)

(72) Inventor: Hiroshi Iwanami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 4 days.

(21) Appl. No.: 18/742,548

(22) Filed: Jun. 13, 2024

(65) Prior Publication Data

US 2024/0330783 A1 Oct. 3, 2024

Related U.S. Application Data

(63) Continuation of application No. 17/136,683, filed on Dec. 29, 2020, now abandoned, which is a continuation of application No. 15/540,105, filed as application No. PCT/JP2015/079484 on Oct. 19, 2015, now Pat. No. 10,902,354.

(30) Foreign Application Priority Data

Jan. 14, 2015 (JP) ................................ 2015-005058

(51) Int. Cl.
 *G06Q 10/02* (2012.01)
 *G06F 16/29* (2019.01)
 *G06Q 30/0283* (2023.01)

(52) U.S. Cl.
 CPC ............ *G06Q 10/02* (2013.01); *G06F 16/29* (2019.01); *G06Q 30/0283* (2013.01)

(58) Field of Classification Search
 CPC ...... G06Q 10/02; G06Q 30/0283; G06F 16/29
 See application file for complete search history.

(56) References Cited

U.S. PATENT DOCUMENTS

| | | | |
|---|---|---|---|
| 2007/0192038 A1 | 8/2007 | Kameyama | |
| 2014/0019172 A1* | 1/2014 | Oxenham | G01C 21/3423 705/5 |
| 2014/0019712 A1 | 1/2014 | Ould-Ahmed-Vall et al. | |
| 2015/0066546 A1* | 3/2015 | Scarborough | G06Q 10/02 705/5 |

(Continued)

FOREIGN PATENT DOCUMENTS

| | | |
|---|---|---|
| DE | 102007005627 A1 | 10/2007 |
| JP | 2002-175354 A | 6/2002 |

(Continued)

OTHER PUBLICATIONS

Weihong Guo, Detecting Older Drivers' Stress Level during Real-World Driving Tasks, Nov. 6, 2013 (Year: 2013).*

(Continued)

*Primary Examiner* — Ismail A Manejwala
(74) *Attorney, Agent, or Firm* — CHIP LAW GROUP

(57) ABSTRACT

The information processing system includes a generation unit that specifies a user who occupies or reserves occupation of a specific space unit in a predetermined area, and generates a heat map in accordance with attribute information about the user and a providing unit that provides the heat map as a user interface for the user to select a specific space in the predetermined area.

15 Claims, 18 Drawing Sheets

(56) References Cited

U.S. PATENT DOCUMENTS

| | | | | |
|---|---|---|---|---|
| 2015/0242763 | A1* | 8/2015 | Zamer | G06T 11/60 |
| | | | | 705/5 |
| 2015/0276415 | A1* | 10/2015 | Shrinath | G01C 21/34 |
| | | | | 701/1 |
| 2015/0338116 | A1 | 11/2015 | Furuta et al. | |
| 2016/0047672 | A1* | 2/2016 | Sachdev | G01C 21/3685 |
| | | | | 701/438 |
| 2016/0155181 | A1 | 6/2016 | Romaya et al. | |
| 2016/0170996 | A1 | 6/2016 | Frank et al. | |
| 2016/0171891 | A1* | 6/2016 | Banatwala | G08G 1/144 |
| | | | | 340/932.2 |
| 2018/0303396 | A1* | 10/2018 | Wild | G16H 10/60 |

FOREIGN PATENT DOCUMENTS

| | | |
|---|---|---|
| JP | 2005-085024 A | 3/2005 |
| JP | 2006-031279 A | 2/2006 |
| JP | 2007-212421 A | 8/2007 |
| JP | 2007-310634 A | 11/2007 |
| JP | 2009-032176 A | 2/2009 |
| JP | 2009-110312 A | 5/2009 |
| JP | 2010-176483 A | 8/2010 |
| JP | 2014-149709 A | 8/2014 |

OTHER PUBLICATIONS

International Search Report and Written Opinion of PCT Application No. PCT/JP2015/079484, issued on Jan. 19, 2016, 07 pages of English Translation and 07 pages of ISRWO.

International Preliminary Report on Patentability of PCT Application No. PCT/JP2015/079484, issued on Jul. 27, 2017, 07 pages of English Translation and 04 pages of IPRP.

Non-Final Office Action for U.S. Appl. No. 15/540,105, issued on Apr. 16, 2019, 23 pages.

Non-Final Office Action for U.S. Appl. No. 15/540,105, issued on Mar. 6, 2020, 16 pages.

Final Office Action for U.S. Appl. No. 15/540,105, issued on Nov. 6, 2019, 24 pages.

Final Office Action for U.S. Appl. No. 15/540,105, issued on May 7, 2020, 15 pages.

Advisory Action for U.S. Appl. No. 15/540,105, issued on Jan. 3, 2020, 03 pages.

Advisory Action for U.S. Appl. No. 15/540,105, issued on Jul. 2, 2020, 04 pages.

Notice of Allowance for U.S. Appl. No. 15/540,105, issued on Sep. 30, 2020, 18 pages.

Final Office Action for U.S. Appl. No. 17/136,683 issued on Apr. 22, 2024, 12 pages.

Final Office Action for U.S. Appl. No. 17/136,683 issued on Jul. 11, 2023, 21 pages.

Non-Final Office Action for U.S. Appl. No. 17/136,683, issued on Dec. 20, 2023, 14 pages.

Non-Final Office Action for U.S. Appl. No. 17/136,683, issued on Jan. 5, 2023, 17 pages.

Advisory Action for U.S. Appl. No. 17/136,683, issued on Sep. 20, 2023, 03 pages.

Manase Chiweshe, One of the boys: female fans' responses to the masculine and phallocentric nature of football stadiums in Zimbabwe, Aug. 8, 2014, Critical African Studies, Abstract (Year: 2014).

Anthony Shelton, Affecting Penn State Fan Behavior, Apr. 18, 2011, (Year: 2011).

* cited by examiner

FIG. 6

| RESERVATION NUMBER | SEAT NUMBER | GROUP ID |
|---|---|---|
| 2014102601 | 1A | - |
| 2014102701 | 10A | 1 |
| 2014102701 | 10B | 1 |
| 2014102702 | 3A | 2 |
| 2014102702 | 3B | 2 |
| 2014102702 | 3C | 2 |
| 2014102702 | 5A | 2 |
| 2014102702 | 5B | 2 |
| 2014102702 | 6A | 2 |
| 2014102702 | 6B | 2 |
| 2014102702 | 6C | 2 |
| 2014102702 | 7A | 2 |
| 2014102702 | 7B | 2 |
| 2014102702 | 7C | 2 |
| 2014102702 | 11A | 3 |
| 2014102702 | 11B | 3 |
| 2014102702 | 11C | 3 |
| ... | ... | ... |

INFORMATION PROCESSING SYSTEM AND CONTROL METHOD

CROSS REFERENCE TO RELATED APPLICATIONS

The present application is a continuation application of U.S. patent application Ser. No. 17/136,683, filed on Dec. 29, 2020, which is a continuation application of U.S. patent application Ser. No. 15/540,105, filed on Jun. 27, 2017, now patent Serial No. U.S. Pat. No. 10,902,354, which is a National Stage Entry of Patent Application No. PCT/JP2015/079484 filed on Oct. 19, 2015, which claims priority from prior Japanese Patent Application JP 2015-005058 filed in the Japan Patent Office on Jan. 14, 2015, the entire contents of which are hereby incorporated by reference.

TECHNICAL FIELD

The present disclosure relates to an information processing system and a control method.

BACKGROUND ART

Recently, a seat reservation system in which seat reservation in a train, a bus, an airplane or the like is made by an individual via Internet has been used available with the development of communication technologies. If a seat can be designated, a user can designate a seat for reservation after the user has designated a date and a time. With respect to the seat designation, there are preferences according to a person, such as a window side, aisle side, front side, center, and rear side of the vehicle, and the user may perform seat designation while referring to a specific seat screen.

For example, with respect to such a seat reservation system technique, Patent Literatures 1 to 3 have been proposed. Specifically, Patent Literature 1 discloses a seat reservation system in which a color classification for each seat is displayed according to a preference of the user on the basis of a comfort index obtained by digitizing a noise level, an outside view, convenience of entrance and exit, a distance to a bathroom, or the like.

Further, Patent Literature 2 discloses a system in which a seat that matches a desired condition for an environment surrounding a seat to be reserved, for example, a condition that an adjacent passenger is of the same gender or that there is no infant in nearby seats, is allocated to a user who desires reservation.

Further, the following Patent Literature 3 discloses a system for performing a reservation of a designated seat according to preferences (widow side, no smoking, and regular cars are preferred) with respect to railroad seats.

CITATION LIST

Patent Literature

Patent Literature 1

JP 2007-310634A

Patent Literature 2

JP 2010-176483A

Patent Literature 3

JP 2002-175354A

DISCLOSURE OF INVENTION

Technical Problem

However, it is difficult to predict in advance whether a reserved seat will be a comfortable seat for a user when the user actually sits in the seat in every seat reservation system. Further, such a problem does not occur only in a seat reservation system, but also occurs when selecting a specific space unit.

Accordingly, the present disclosure proposes an information processing system and a control method capable of effectively selecting a specific space unit.

Solution to Problem

According to the present disclosure, there is provided an information processing system including: a generation unit that specifies a user who occupies or reserves occupation of a specific space unit in a predetermined area, and generates a heat map in accordance with attribute information about the user; and a providing unit that provides the heat map as a user interface for the user to select a specific space in the predetermined area.

According to the present disclosure, there is provided a control method including: specifying a user who occupies or reserves occupation of a specific space unit in a predetermined area, and generating a heat map in accordance with attribute information about the user; and providing the heat map as a user interface for the user to select a specific space in the predetermined area.

Advantageous Effects of Invention

According to the above described present disclosure, it is possible to effectively select a specific space unit.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram showing an example of group information included in seat reservation information according to the first embodiment.

MODE(S) FOR CARRYING OUT THE INVENTION

Figure 1:
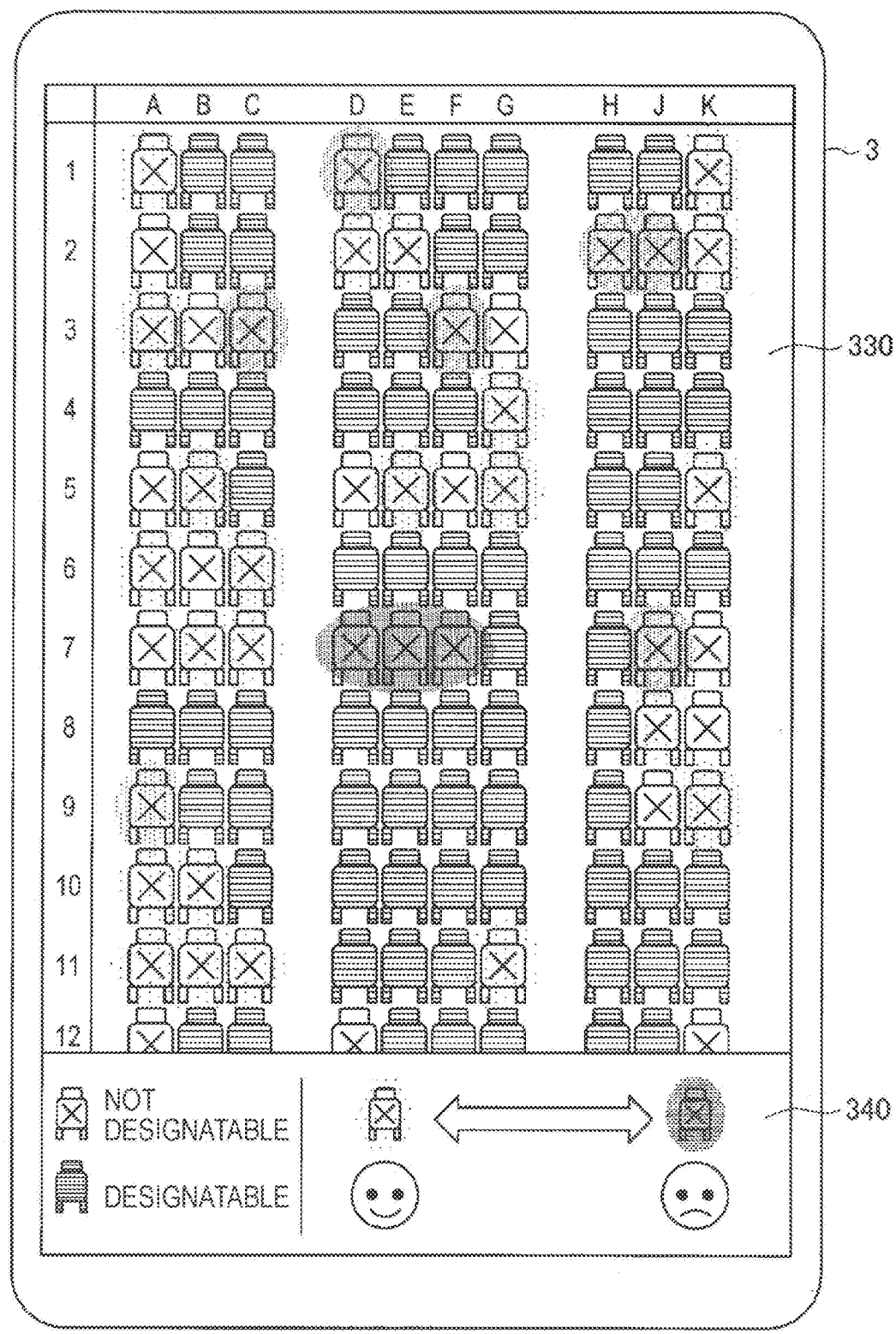
FIG. 1 is a diagram illustrating an overview of an information processing system according to an embodiment of the present disclosure.

Hereinafter, (a) preferred embodiment(s) of the present disclosure will be described in detail with reference to the appended drawings. In this specification and appended drawings, structural elements that have substantially the same function and structure are denoted with the same reference numerals, and repeated explanation of these structural elements is omitted.

Further, the description will be provided in the following order.

1. Overview of information processing system according to an embodiment of the present disclosure
2. First embodiment
3. Second embodiment
4. Third embodiment
5. Conclusion

1. Overview of Information Processing System According to an Embodiment of the Present Disclosure First, an overview of an information processing system according to an embodiment of the present disclosure will be described with reference to FIG. 1. As shown in FIG. 1, in an information processing system according to this embodiment, when selecting a specific space, for example, when reserving seats of a train, a bus, an airplane, or the like, a user can reserve a seat from a seat reservation screen displayed on a user terminal 3. As shown in FIG. 1, on the seat reservation screen, seats that can be designated and seats that cannot be designated are clearly indicated. The user selects an arbitrary seat from the seats that can be designated.

Here, in a seat reservation system in a related art, it is possible to select a favorite seat of the user from vacant seats with reference to a seat table, but it is difficult to predict in advance whether the seat is a comfortable seat for a user when the user actually sits on the seat. For example, although a seat such as a window side seat or an aisle side seat is a favorite seat, in a case in which a person with bad manners who cannot be guessed from age and sex is sitting next to a user or in a case in which the seat is surrounded by a large group of guests, the comfort of the seat noticeably changes.

Further, such a problem does not occur only in the seat reservation system, but may also occur in selecting a specific space such as a room or a parking place.

Accordingly, in consideration of the above-mentioned problem, an information processing system according to the present disclosure specifies a heat map based on information about personality (a sensitivity value to be described later) indicating nature, character, credibility, or the like of another person who occupies a surrounding space or information about a group of such people when selecting a specific space to make it possible to more effectively select a specific space unit.

For example, as shown in FIG. 1, by displaying a heat map based on sensitivity values of reservers with respect to seats that cannot be designated, that is, already reserved seats, a user can intuitively recognize which seat is occupied by a person with a low sensitivity value (specifically, a person with low credibility or a person with bad behavior), which seat is occupied by a person with a high sensitivity value (specifically, a person with high credibility, a person with good behavior, or the like). For example, it can be understood that seats 7D, 7E, and 7F among the seats shown in FIG. 1 are reserved by a person with a low sensitivity value, and thus, for example, seat 7G may be avoided. Thus, it is possible to more effectively select a seat in consideration of information about other surrounding users in addition to positions of seats.

The overview of an information processing system according to one embodiment of the present disclosure has been described above. Subsequently, the information processing system according to an embodiment of the present disclosure will be specifically described using a plurality of embodiments.

2. First Embodiment

2-1. Configuration

Figure 2:
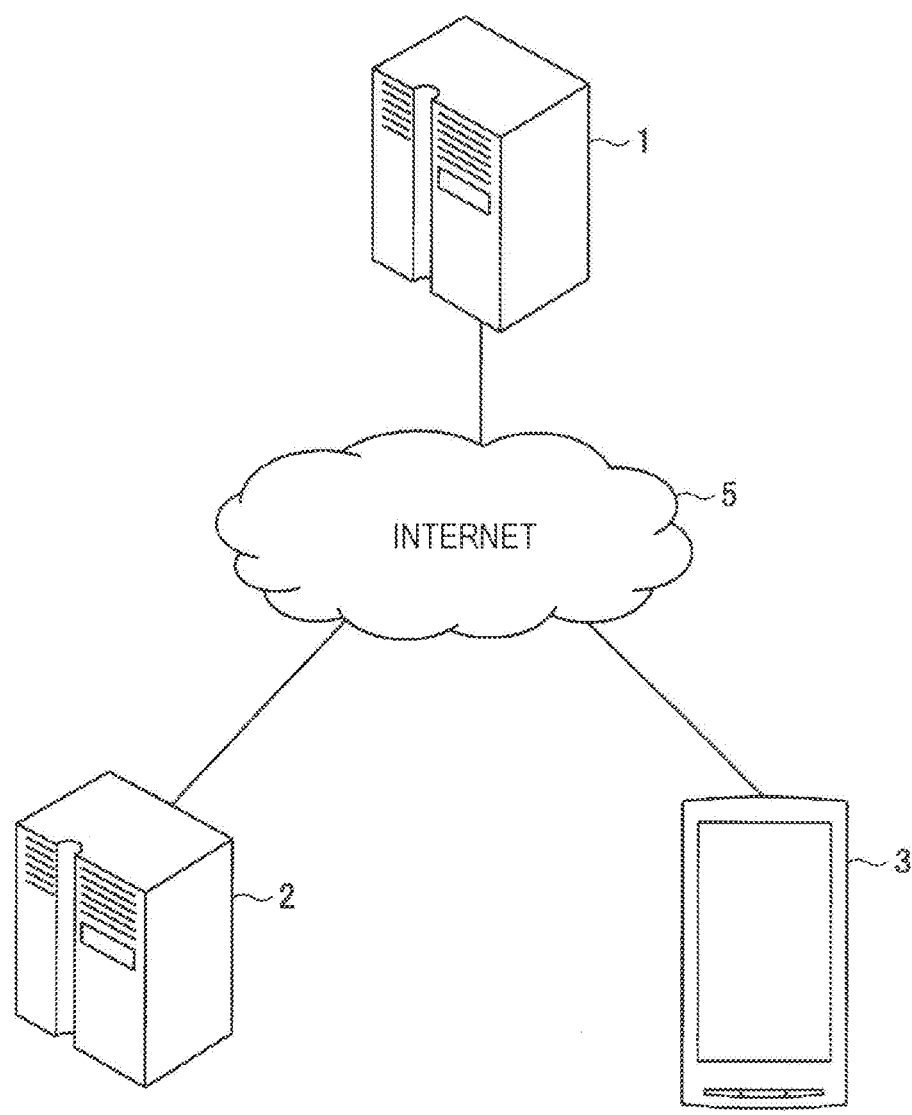
FIG. 2 is a diagram showing an overall configuration of an information processing system according to a first embodiment.

FIG. 2 is a diagram showing an overall configuration of an information processing system according to a first embodiment. As shown in FIG. 2, the information processing system according to this embodiment includes a reservation server 1, a sensitivity server 2, and a user terminal 3. These devices are connected to each other through, for example, the Internet 5.

The reservation server 1 is, for example, a server that manages a seat reservation of a train, a bus, an airplane, or the like. Specifically, the reservation server 1 displays a seat reservation screen on a display screen of the user terminal 3 according to an access of a user from the user terminal 3, and executes reservation of a seat according to an operation input of the user. Here, the reservation server 1 displays a heat map based on sensitivity values of reservers or a heat map based on reserving group information with respect to seats which have already been reserved on the seat reservation screen. The sensitivity values of the reservers can be acquired from the sensitivity server 2. Further, the reservation server 1 is not limitedly configured by a single device, but may also be configured by a reservation system including a plurality of devices.

The sensitivity server 2 accumulates a "sensitivity value" which is a specific indicator of what kind of person a person is (personality such as nature, character, or credibility). The "sensitivity value" is obtained by digitizing a feeling with respect to a thing or a person, which is calculated on the basis of an evaluation value of an interaction (that is, behavior) occurred between a plurality of objects including people or things. For example, a person who roughly handles things is calculated to have a low sensitivity value, and is determined as a rough person and as a person with low credibility. Further, in a case of a person with a high sensitivity value, the person is determined as a person who is credible.

The user terminal 3 is a communication terminal operated by a user, and for example, is realized by a smartphone. The user inputs reservation information to a seat reservation screen displayed on the user terminal 3. Further, since a heat map based on sensitivity values of reservers or a heat map based on group information of reservers is displayed with respect to seats which have already been reserved on the seat reservation screen, the user can select a comfortable seat with reference to the information.

Hereinafter, a basic configuration of each device included in the information processing system according to this embodiment will be described with reference to FIGS. 3 and 4.

(2-1-1. Configuration of the Reservation Server 1)

Figure 3:
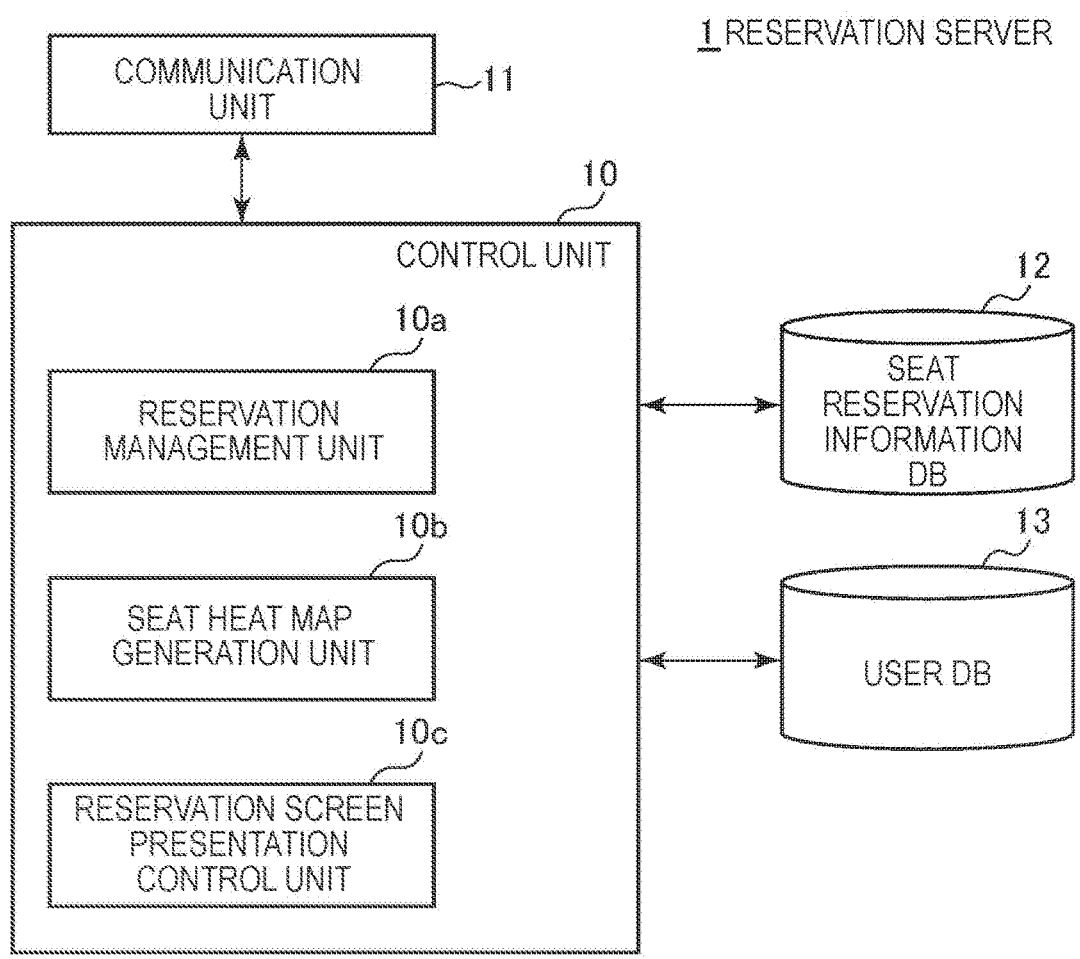
FIG. 3 is a block diagram showing an example of a configuration of a reservation server according to the first embodiment.
Figure 4:
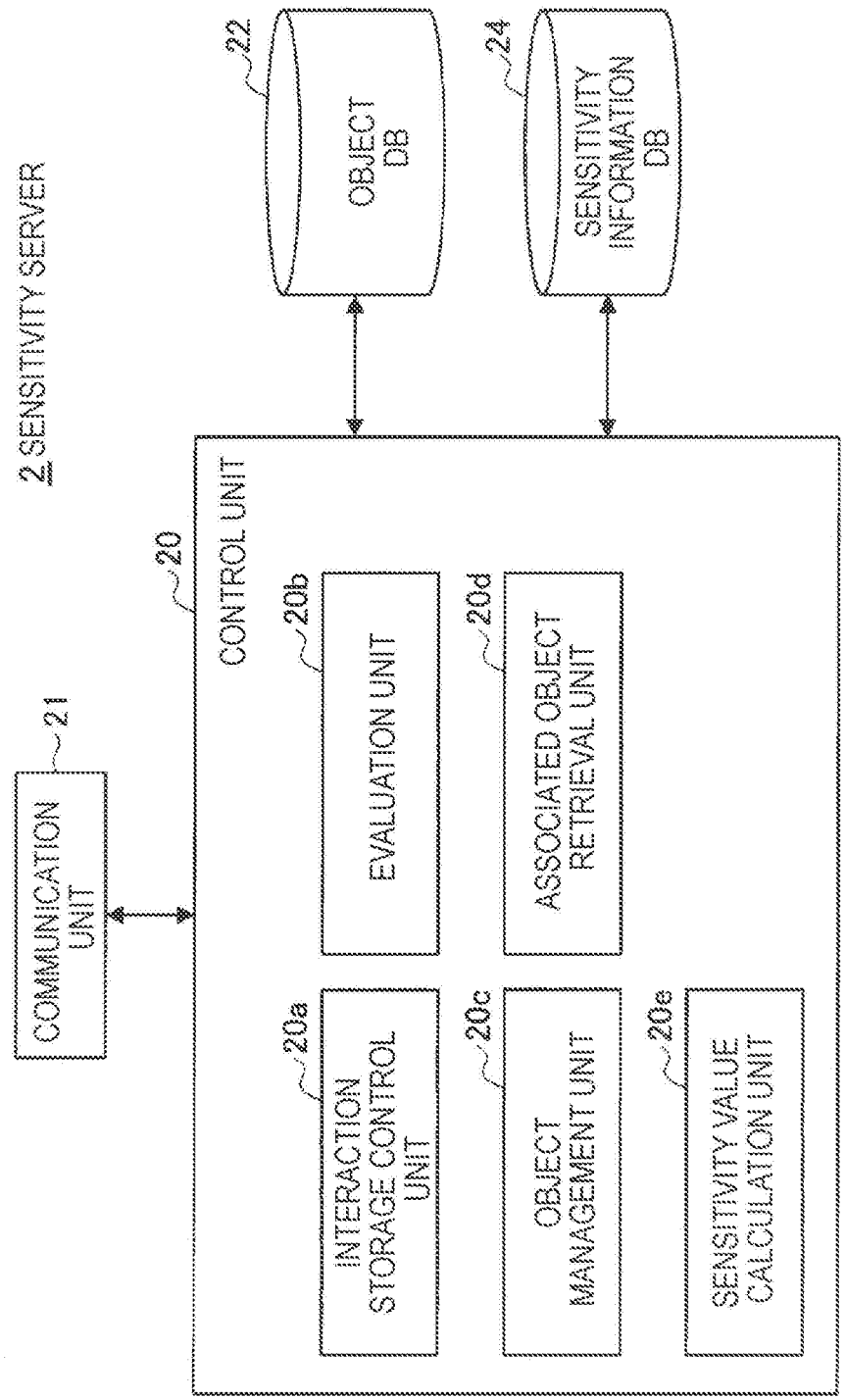
FIG. 4 is a block diagram showing an example of a configuration of a sensitivity server according to the first embodiment.

FIG. 3 is a block diagram showing an example of a configuration of the reservation server 1 according to this embodiment. As shown in FIG. 3, the reservation server 1 includes a control unit 10, a communication unit 11, a seat reservation information database (DB) 12, and a user DB 13.

(Control Unit)

The control unit 10 controls each of components of the reservation server 1. The control unit 10 is realized by a microcomputer including a central processing unit (CPU), a read only memory (ROM), a random access memory (RAM), and a nonvolatile memory. Further, the control unit 10 according to this embodiment also functions as a reservation management unit 10a, a seat heat map generation unit 10b, and a reservation screen presentation control unit 10c, as shown in FIG. 3.

The reservation management unit 10a performs seat reservation management (registration, change, and deletion). More specifically, the reservation management unit 10a receives reservation information such as a reservation service number, a reserved seat number, or reserver information from the user terminal 3 (that is, a reservation terminal) as seat reservation information of a train, a bus, an airplane or the like, and stores a result thereof in the seat reservation information DB 12. When accessing the reservation server 1 from the user terminal 3, a log-in using information for specifying a user such as a log-in ID may be performed.

Further, the reservation management unit 10a changes or deletes reservation information stored in the seat reservation information DB 12 in accordance with a change instruction or a deletion instruction from the user terminal 3. Further, in a case in which a plurality of seats are reserved by a group, the reservation management unit 10a assigns a group ID as reservation information of the respective seats.

The seat heat map generation unit 10b generates a seat heat map to be included in a seat reservation screen. Specifically, the seat heat map generation unit 10b extracts a seat which has already been reserved with reference to the seat reservation information DB 12, and extracts an object ID associated with a user ID from the user DB 13 on the basis of a user ID of a seat reserver. Subsequently, the seat heat map generation unit 10b makes an inquiry to the sensitivity server 2 using the extracted object ID and acquires a sensitivity value of an object (that is, the seat reserver). In this specification, the sensitivity value is obtained by digitizing an object character of personality such as credibility (for example, an arrogant attitude at a time at which a service is enjoyed, rough treatment of equipment, or the like) calculated from an interaction history between objects when people and objects are regarded as the objects. Since the interaction between the objects may be expressed as a multi-dimensional vector, the sensitivity value is calculated by optimizing for each service or product using an interaction evaluation value obtained by lowering a dimension or converting a vector into a simple scalar value to easily handle the vector. Further, the seat heat map generation unit 10b generates a heat map, in which sensitivity values of reservers are reflected, so that a user intuitively and easily recognizes the acquired sensitivity values of the respective seat reservers. For example, the seat heat map generation unit 10b color-classifies seats according to the sensitivity values, and may represent levels of sensitivity values according to differences between densities or colors.

Further, in addition to use of sensitivity values of reservers, in a case in which a group ID is given to the reservers, the seat heat map generation unit 10b may generate a heat map in which the group information is reflected on seats. For example, the seat heat map generation unit 10b may perform a display to surround seats of reservers who are given the same group ID or may give the same color thereto to represent seats that belong to a group.

The reservation screen presentation control unit 10c has a function of performing control for generating a seat reservation screen including a seat heat map generated by the seat heat map generation unit 10b and presenting the seat reservation screen to the user terminal 3. For example, the reservation screen presentation control unit 10c performs control for transmitting control information (also referred to as reservation screen display information) for displaying a reservation screen to the user terminal 3 through the communication unit 11.

(Communication Unit)

The communication unit 11 performs transmission and reception of data with an external device. For example, the communication unit 11 is connected to the sensitivity server 2 to receive a sensitivity value corresponding to an object ID, or is connected to the user terminal 3 to transmit reservation screen display information or to receive reservation information.

(Seat Reservation Information DB)

The seat reservation information DB 12 is a storage unit that stores information relating to seat reservation. For example, the seat reservation information DB 12 stores reservation information such as a reservation service number, a reserved seat number, reserver information, or a group ID.

(User DB)

The user DB 13 is a storage unit that stores user information (a user ID, name, age, gender, address, e-mail address, and the like) that can be specified by a log-in ID in the reservation server 1, and an object ID associated with the user ID.

The configuration of the reservation server 1 has been specifically described above. The configuration of the reservation server 1 shown in FIG. 3 is an example, and the configuration of the reservation server 1 according to this embodiment is not limited thereto. For example, the storage unit such as the seat reservation information DB 12 or the user DB 13 may be stored in an external storage device on a network.

(2-1-2. Configuration of Sensitivity Server 2)

Then, a configuration of the sensitivity server 2 according to this embodiment will be described. FIG. 4 is a block diagram showing an example of the configuration of the sensitivity server 2 according to this embodiment. As shown in FIG. 4, the sensitivity server 2 includes a control unit 20, a communication unit 21, an object DB 22, and a sensitivity information DB 24.

(Communication Unit)

The communication unit 21 is connected to the reservation server 1 through a network, and returns a sensitivity value associated with an object ID which is inquired from the reservation server 1. Further, the communication unit 21 receives interaction information from a sensing device (not shown) attached to or mounted on each object (including people and things).

(Control Unit)

The control unit 20 controls each of components of the sensitivity server 2. Further, the control unit 20 is realized by a microcomputer including a CPU, a ROM, a RAM, and a non-volatile memory. In addition, the control unit 20 according to this embodiment functions as an interaction storage control unit 20a, an evaluation unit 20b, an object management unit 20c, an associated object retrieval unit 20d, and a sensitivity value calculation unit 20e.

The interaction storage control unit 20a performs control for storing interaction information received from the sensing device attached to or mounted in the object in the sensitivity information DB 24. The sensing device is realized by a moisture sensor, a temperature sensor, a vibration sensor, an infrared sensor, a camera, a tactile sensor, a gyro sensor, or the like, and detects an interaction with respect to the object from another object. The interaction refers to an action, and for example, may be a conversation, a telephone call, an e-mail, a gift of a present, or the like between people.

Further, the interaction may be caring, storing, cleaning, appreciating, wearing of things, or the like between a person and a thing.

The evaluation unit 20b evaluates an interaction stored in the sensitivity information DB 24. A method for evaluating an interaction is not particularly limited, and for example, the evaluation unit 20b highly evaluates an interaction which is preferable for an object receiving the interaction, and specifically, gives points of −1.0 to 1.0. An evaluation result is stored in the sensitivity information DB 24 in association with the interaction.

The object management unit 20c performs management such as registration, change, deletion, or the like of information relating to an object stored in the object DB 22.

The associated object retrieval unit 20d retrieves another object on which an interaction has occurred with a required object ID as an associated object from the object DB 22 or the sensitivity information DB 24.

The sensitivity value calculation unit 20e calculates a sensitivity value of a target user on the basis of an interaction evaluation associated with an object ID of the target user. For example, the sensitivity value calculation unit 20e may calculate a total sensitivity value of the target user on the basis of a total of interaction evaluation values, or may calculate the total sensitivity value of the target user on the basis of an average value of the interaction evaluation values.

Further, depending on usage of a sensitivity value in an inquiry source, the sensitivity value calculation unit 20e may calculate a sensitivity value only using a predetermined interaction or using a value obtained by applying a weight to a predetermined interaction. For example, in a case in which a sensitivity value is used to make a reservation in the reservation server 1, the sensitivity value calculation unit 20e may focus on an interaction between a designated object (a seat reserver) and an associated object such as a courier service, a moving service, a service provider, or a vehicle such as a train, a bus, or an airplane to calculate a sensitivity value. Thus, in such a manner through which a sensitivity value of an object (a seat reserver) that performs an interaction such as a tough telephone call or has an arrogant attitude toward a service provider is calculated to be low, for example, a sensitivity value of an object at a time at which a service is enjoyed is optimally calculated.

(Object DB)

The object DB 22 is a storage unit that stores an object ID of each object. Further, in the object DB 22, a variety of information relating to objects such as names, genders, service types, service companies, product names, product types, maker IDs, model numbers, or manufacturing dates and times are stored, in addition to the object ID.

(Sensitivity Information DB)

The sensitivity information DB 24 is a storage unit that stores an interaction between objects or an evaluation of the interaction.

2-2. Operation Process (2-2-1. Seat Reservation Screen Presentation Process Using Group Information)

Figure 5:
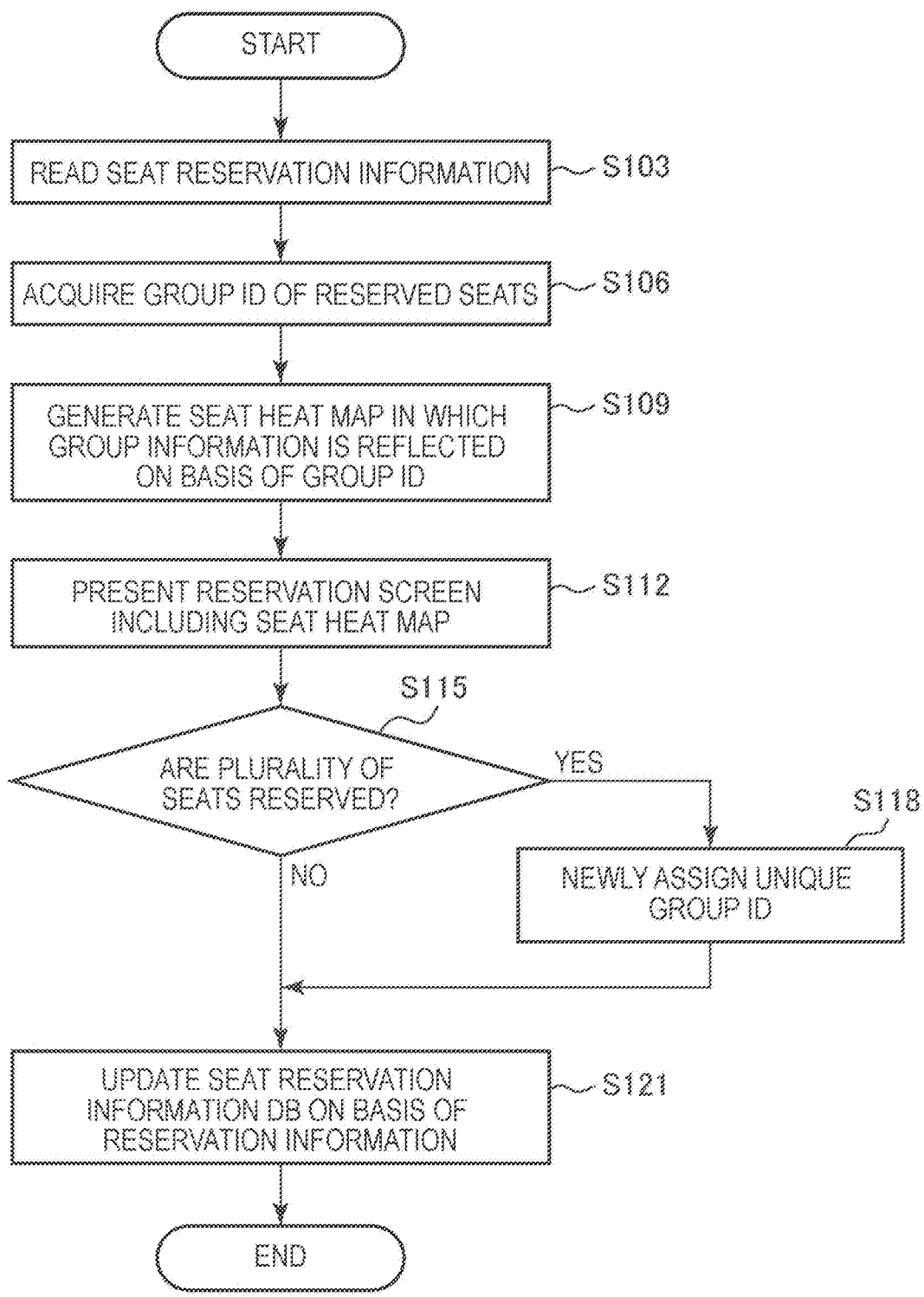
FIG. 5 is a flowchart showing a reservation process based on a seat reservation screen, in which group information is reflected, according to the first embodiment.

Subsequently, a reservation process according to the first embodiment will be described. First, as an example, a reservation process of presenting a seat heat map generated using group information will be described with reference to FIG. 5. FIG. 5 is a flowchart illustrating a reservation process based on a seat reservation screen, in which group information is reflected, according to this embodiment.

As shown in FIG. 5, in step S103, when access and log-in from the user terminal 3 are performed, the seat heat map generation unit 10*b* reads seat reservation information of a service designated as a reservation target from the seat reservation information DB 12.

Then, in step S106, the seat heat map generation unit 10*b* acquires a group ID of seats which have already been reserved on the basis of the seat reservation information. Here, FIG. 6 shows an example of group information included in the seat reservation information. As shown in FIG. 6, a unique reservation number, a seat number, and a group ID are associated with each other in the group information. The group ID is assigned in a case in which there is a high possibility that there will be a reservation from a group on the basis of information indicating that a plurality of reservations are simultaneously performed or that seats are designated in association with the same reservation. Thus, for example, it can be understood that seats 10A and 10B belong to one group, and seats 3A to 3C, 5A, 5B, 6A to 6C, and 7A to 7C belong to another group. Further, since a seat 1A is not assigned a group ID, it can be understood that the seat 1A does not correspond to a reservation from a group. The group information shown in FIG. 6 is information that is partially excerpted and shown as an example.

Then, in step S109, the seat heat map generation unit 10*b* generates a seat heat map, in which the group information is reflected, on the basis of the group ID.

Figure 7:
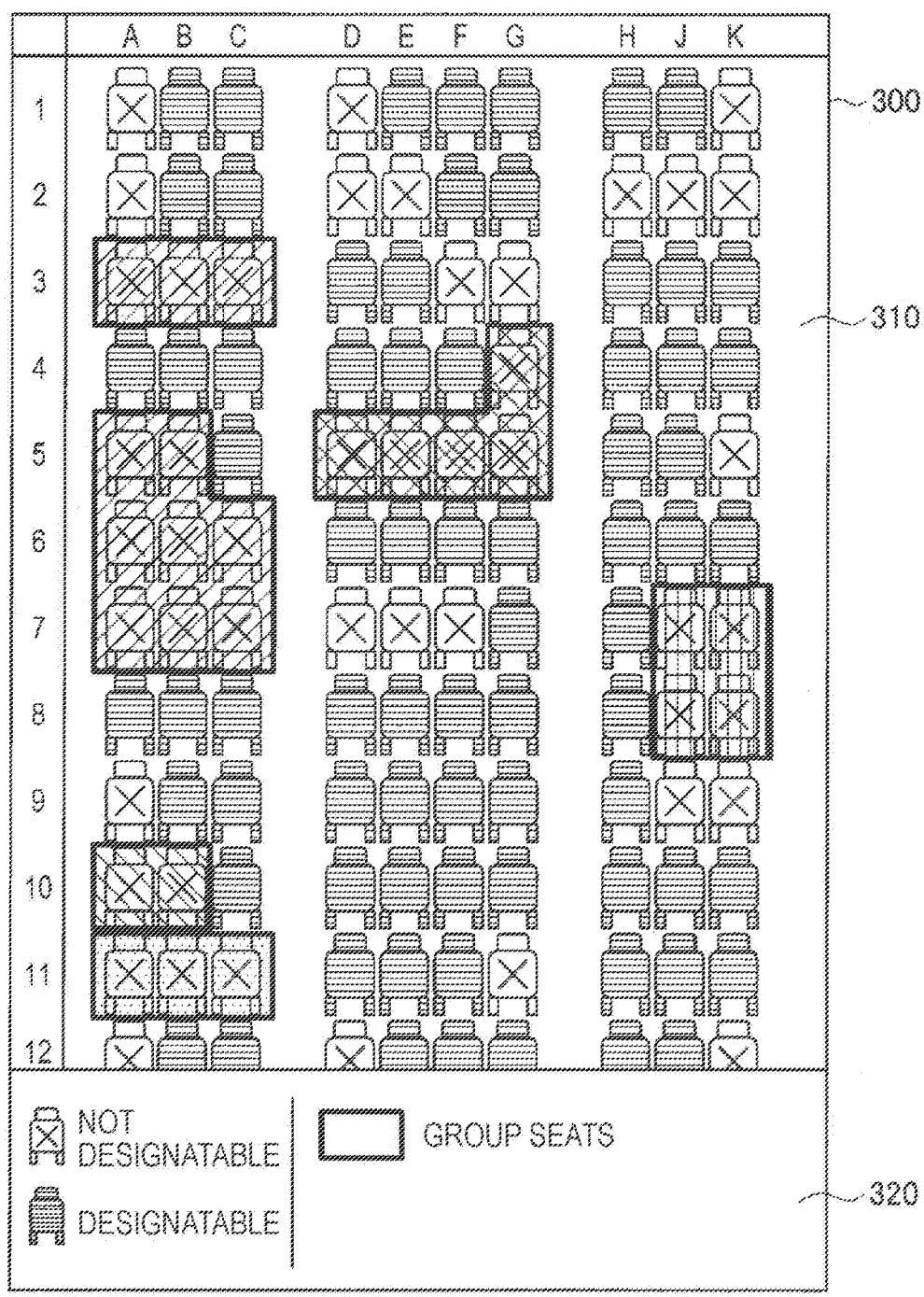
FIG. 7 is a diagram showing an example of a reservation screen including a seat heat map, in which the group information is reflected, according to the first embodiment.

Then, in step S112, the reservation screen presentation control unit 10*c* performs control for presenting a reservation screen including the seat heat map by the user terminal 3. Here, FIG. 7 shows an example of a reservation screen including a seat heat map in which group information is reflected. As shown in FIG. 7, a reservation screen 300 includes a seat heat map 310, in which group information is reflected, and a legend display 320. As shown in the legend display 320, cross marks are given to seats that have already been reserved and cannot be designated (for example, seats 1A, 1D, and 1K). Further, predetermined colors are given to seats that have not yet been reserved and that can be designated (for example, seats 1B, 1C, and 1E to 1J).

Further, seats which have been reserved by a group among the seats that cannot be designated are displayed with the same color classification for each group, and thus, it is obvious that the seats belong to the same group. For example, in the seat heat map 310 shown in FIG. 7, it can be understood that the seats 3A to 3C, 5A, 5B, 6A to 6C, and 7A to 7C are seats of the same group, and similarly, seats 10A and 10B are seats of another group. Thus, a user who makes a new reservation may perform a seat selection for avoiding a seat 5C with reference to the seat heat map 310, for example, if the user wants to work quietly while aboard.

In the example shown in FIG. 7, groups are represented by color classifications of seats in the seat heat map 310, but the present embodiment is not limited thereto, and for example, the groups may be represented by numbers, icons, or the like.

Then, in a case in which a plurality of seats have been reserved by a user ("Yes" in S115), in step S118, the reservation management unit 10*a* newly assigns a unique group ID to the plurality of seats.

Then, in a case in which a single seat has been reserved by a user ("No" in S115) or if the group ID is assigned thereto (S118) in step S121, the reservation management unit 10*a* registers reservation information including a reserved seat number, a user ID, the assigned group ID in the case of the plurality of seats, or the like in the seat reservation information DB 12 to update the seat reservation information DB 12.

(2-2-2. Seat Reservation Screen Display Process Using Sensitivity Value)

Figure 8:
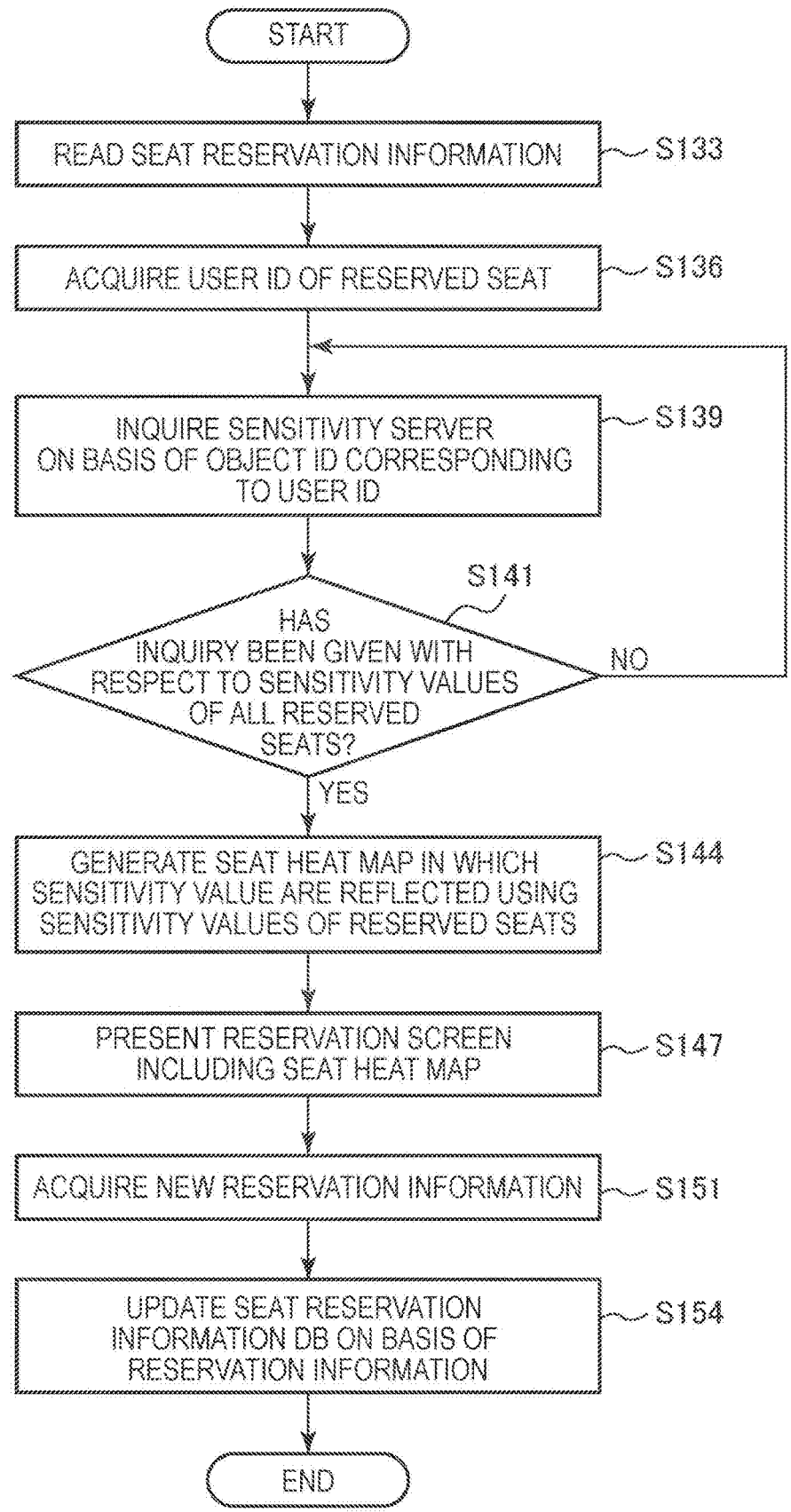
FIG. 8 is a flowchart showing a reservation process based on a seat reservation screen, in which a sensitivity value is reflected, according to the first embodiment.

Next, a reservation process of displaying a generated seat heat map generated using a sensitivity value will be described with reference to FIG. 8. FIG. 8 is a flowchart illustrating a reservation process based on a seat reservation screen, in which a sensitivity value is reflected, according to this embodiment.

As shown in FIG. 8, in step S133, when access and log-in from the user terminal 3 are performed, the seat heat map generation unit 10*b* reads seat reservation information of a flight designated as a reservation target from the seat reservation information DB 12.

Then, in step S136, the seat heat map generation unit 10*b* acquires all user IDs of seats that have already been reserved on the basis of the seat reservation information.

Then, in step S139, the seat heat map generation unit 10*b* converts all of the acquired user IDs into object IDs with reference to the user DB 13, and makes an inquiry to the sensitivity server 2 about sensitivity values of the object IDs (that is, sensitivity values of reservers). A case in which the reservation server 1 has a sensitivity value of an object ID, which has already been acquired, may be excluded.

Subsequently, if the inquiry about the sensitivity values of all of the seats that have already been reserved is terminated ("Yes" in S141), in step S144, the seat heat map generation unit 10*b* generates a seat heat map, in which the sensitivity values are reflected, using the sensitivity values of the seats that have already been reserved.

Figure 9:
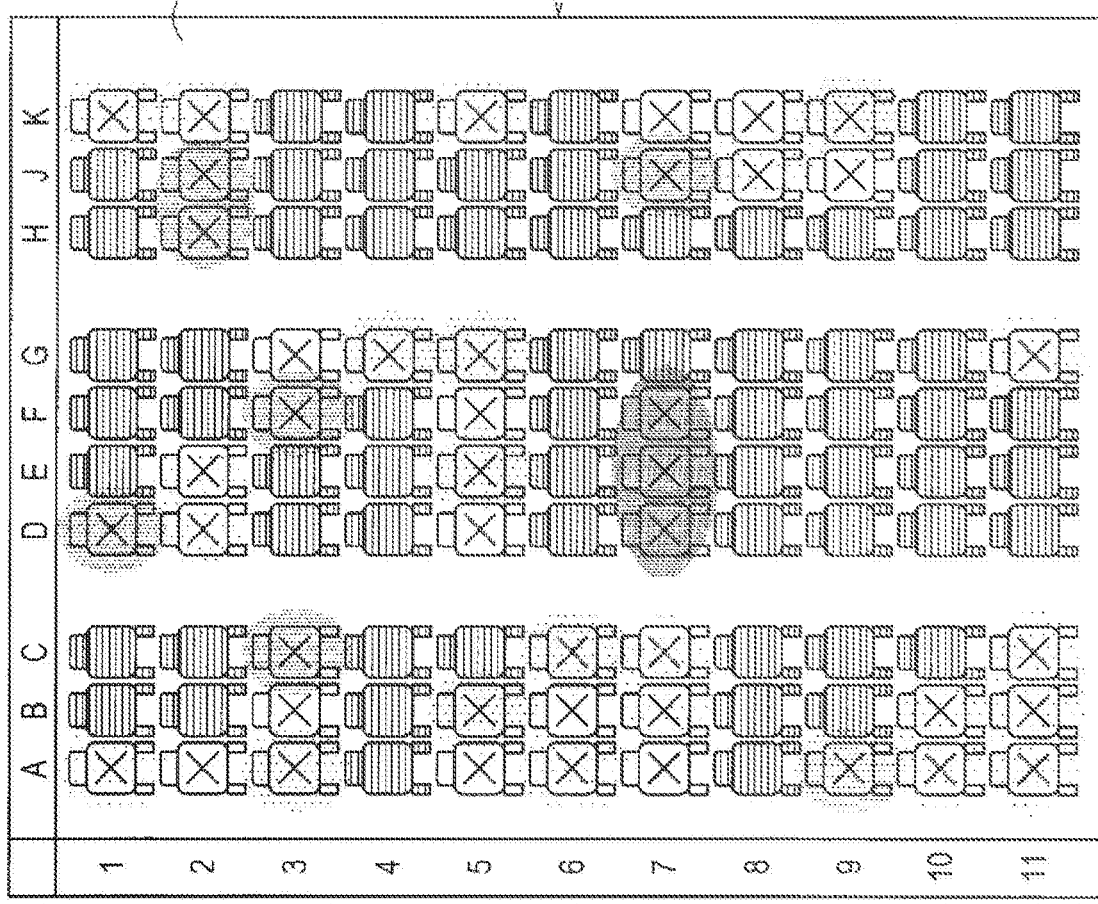
FIG. 9 is a diagram illustrating details of a seat heat map, in which the sensitivity value is reflected, according to the first embodiment.

Then, in step S147, the reservation screen presentation control unit 10*c* performs control for presenting a reservation screen including the seat heat map by the user terminal 3. For example, an example of a reservation screen including a seat heat map in which sensitivity values are reflected is shown in FIG. 1. As shown in FIG. 1, the reservation screen includes a seat heat map 330, in which sensitivity values are reflected, and a legend display 340. As shown in the legend display 340, sensitivity values of seats that cannot be designated (seats that have already been reserved) are represented by color densities, for example, in which the lighter the color, the higher the sensitivity value (for example, the higher the credibility), and the darker the color, the lower the sensitivity value (for example, the lower the credibility). Further, FIG. 9 shows a diagram illustrating details of the seat heat map 330. As shown in FIG. 9, for example, color densities are divided into five stages according to sensitivity values so that a heat map can be generated. In addition, in a case in which a sensitivity value of a desired object ID cannot be acquired from the sensitivity server 2, no color may be assigned as "no sensitivity value" or "N/A" may be displayed instead.

A user who makes a new reservation by referring to the seat heat map 330 shown in FIG. 9 can predict that people having low sensitivity values, that is, rough or arrogant attitudes, at a time at which a service is enjoyed sits on seats 7D to 7F, and thus, can avoid selecting a seat 7G, seats 6D to 6F, and 8D to 8G.

Then, in step S151, the reservation management unit 10*a* acquires new reservation information such as a seat number selected by a user from the user terminal 3.

Further, in step S154, the reservation management unit 10*a* registers reservation information including a reserved seat number, a user ID, or the like in the seat reservation information DB 12 to update the seat reservation information DB 12.

The seat reservation process of presenting a seat heat map according to the first embodiment has been specifically described above. The reservation server 1 may perform control for displaying a seat reservation screen, on which the above-described seat heat map is presented, to a user as a paid service such as a premium class. Thus, an effect for enhancing satisfaction of top customers is also expected.

Further, the reservation server 1 does not directly make an inquiry to the sensitivity server 2, but instead, may acquire a sensitivity value of a seat reserver through a credit information server of a credit information company.

In addition, the seat heat map generation unit 10b of the reservation server 1 may generate a seat heat map reflecting both group information and sensitivity value information. In this case, for example, the seat heat map generation unit 10b may generate a seat heat map in which indicators indicating clusters of groups overlap the seat heat map 330, in which the sensitivity values are reflected, as shown in FIG. 9, a seat heat map in which color classifications of respective groups of the seat heat map 310 shown in FIG. 7 are represented by densities depending on sensitivity values of the respective groups, or the like.

2-3. Modified Examples

Subsequently, modified examples of this embodiment will be described. For example, in the system that presents the seat heat map 330, in which the sensitivity values are reflected, described with reference to FIG. 9, there may be a case in which seats in the vicinity of a seat with a low sensitivity value remain unsold. For example, in a case of seats as shown in FIG. 9, there is a high possibility that seats in the vicinity of seats 7D to 7F remain unsold. In this case, the control unit 10 of the reservation server 1 may perform a process of promoting sales of seats by lowering a price of unsold seats.

Figure 10:
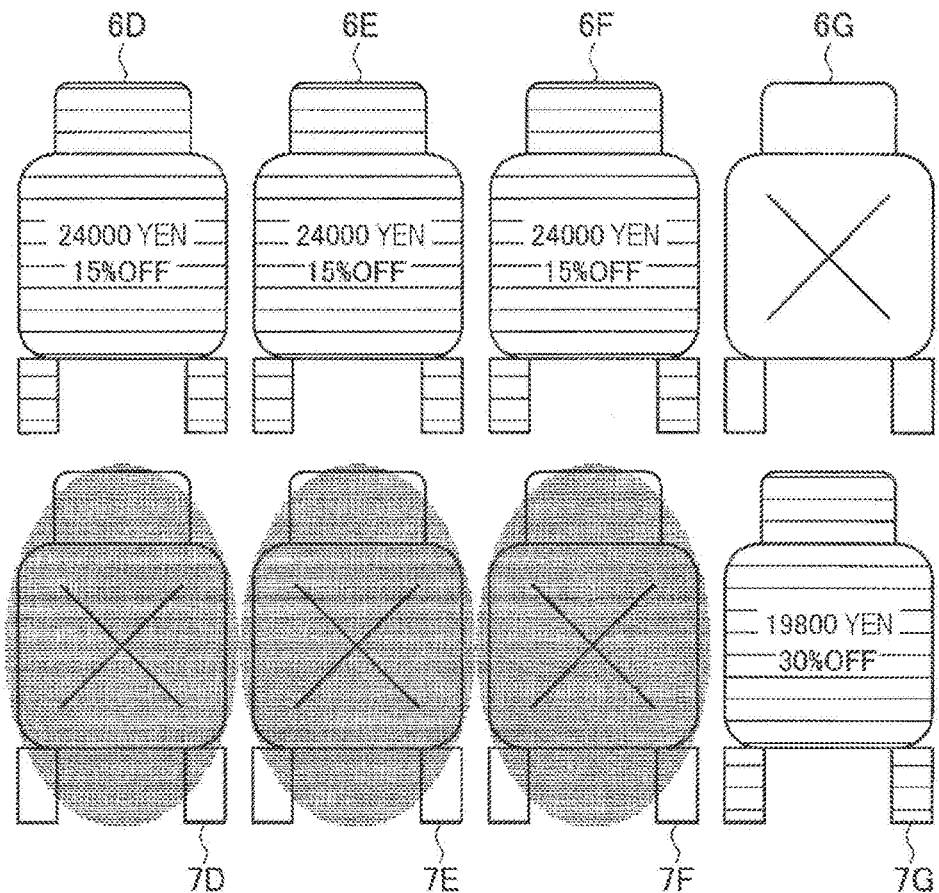
FIG. 10 is a diagram illustrating price changes of unsold seats according to a modified example of the first embodiment.

FIG. 10 is a diagram illustrating price changes of unsold seats according to a modified example of the first embodiment. As shown in FIG. 10, in a case in which sensitivity values of the seats 7D to 7F are low and the seats 6D to 6F and 7G in the vicinity thereof remain unsold, the reservation screen presentation control unit 10c of the reservation server 1 may display price stages such as 30% OFF in a price of the seat 7G, which is a seat next to the seat in question, and 15% OFF, which is a discount rate lower than that of the seat 7G, in a price of each of the seats 6D to 6F, which are seats behind the seat in question, together on the reservation screen.

For example, discount rates of vacant seats may be calculated using the following calculation method in the control unit 10. First, the control unit 10 may calculate discount rates of vacant seats depending on the remaining time until the end of sales of the seats. For example, in a case in which the remaining time is five hours, a discount rate of 10% OFF is set, in a case in which the remaining time is four hours, a discount rate of 20% OFF is set, and in a case in which the remaining time is three hours or less, a discount rate of 30% OFF (in a case in which a maximum discount rate is 30%) is set.

Further, the control unit 10 may also calculate the discount rates on the basis of sensitivity values of seats surrounding the vacant seats. Hereinafter, this case will be described with reference to FIG. 11.

Figure 11:
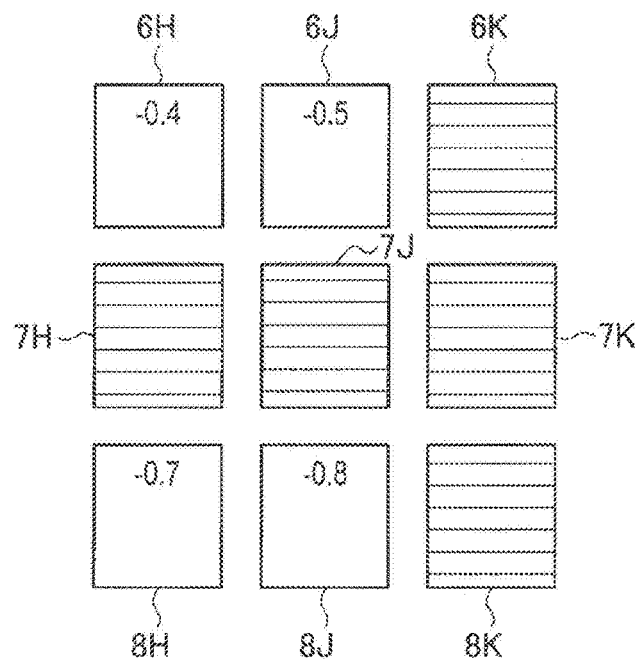
FIG. 11 is a schematic view for illustrating a method for calculating a discount rate of a vacant seat on the basis of sensitivity values of surrounding seats according to the modified example of the first embodiment.

FIG. 11 is a schematic view for illustrating a method for calculating discount rate of a vacant seat on the basis of sensitivity values of surrounding seats. As shown in FIG. 11, for example, when calculating a discount rate of the seat 7J in a case in which the seat 7J is a vacant seat, sensitivity values of eight surrounding seats (seats 6H to 6K, seats 7H and 7K, and seats 8H to 8K) may be used. Here, in a case in which a sensitivity value of the seat 6H is "−0.4", a sensitivity value of the seat 6J is "−0.5", sensitivity values of the vacant seats 6K, 7H, 7K, and 8K are "0" since there are no reservers thereof, a sensitivity value of the seat 7H is "−0.7", and a sensitivity value of the seat 8J is "−0.8", a comfort index S of the seat 7J is calculated using the following expression 1.

$$\begin{aligned}\text{Comfort index } S = \quad & \text{(Expression 1)}\\ \{6H \text{ sensitivity value} + 6J \text{ sensitivity value} + &\\ 6K \text{ sensitivity value} + 7H \text{ sensitivity value} + &\\ 7K \text{ sensitivity value} + 8H \text{ sensitivity value} + &\\ 8J \text{ sensitivity value} + 8K \text{ sensitivity value}\} \div 8 = &\\ \{(-0.4) + (-0.5) + 0 + 0 + 0 + (-0.7) + (-0.8) + 0\} \div 8 = &\\ -0.3 &\end{aligned}$$

Further, the control unit 10 sets the discount rate according to the calculated comfort index S. For example, the control unit 10 sets the discount rate to become greater as the comfort index S becomes lower. The control unit 10 may calculate the comfort index S in a state in which weighting, which depends on a positional relationship with a calculation target seat, is performed for sensitivity values of respective seats in the above Expression 1. For example, this is because a low sensitivity value of a side seat greatly affects a comfort index when compared with front and rear seats, or because a low sensitivity value of a rear seat greatly affects a comfort index due to a seat reclining relationship when compared with a front seat.

3. Second Embodiment

In the above-described embodiment, an example in which a seat selection of an airplane or the like is used as a selection of a specific space is shown, but the information processing system according to the present disclosure is not limited thereto, and for example, even when selecting a piece of real estate such as a detached house or an housing unit in an apartment as a specific space, it is possible to specify users who occupy surroundings and to present a real estate screen in which sensitivity values of the users are reflected. Such a real estate screen presentation process may be performed by a real estate server 6, for example. The real estate server 6 may be connected to the sensitivity server 2 and the user terminal 3 shown in FIG. 2 through, for example, the Internet 5. Hereinafter, a basic configuration of the real estate server 6 according to this embodiment will be described with reference to FIG. 12.

3-1. Configuration

Figure 12:
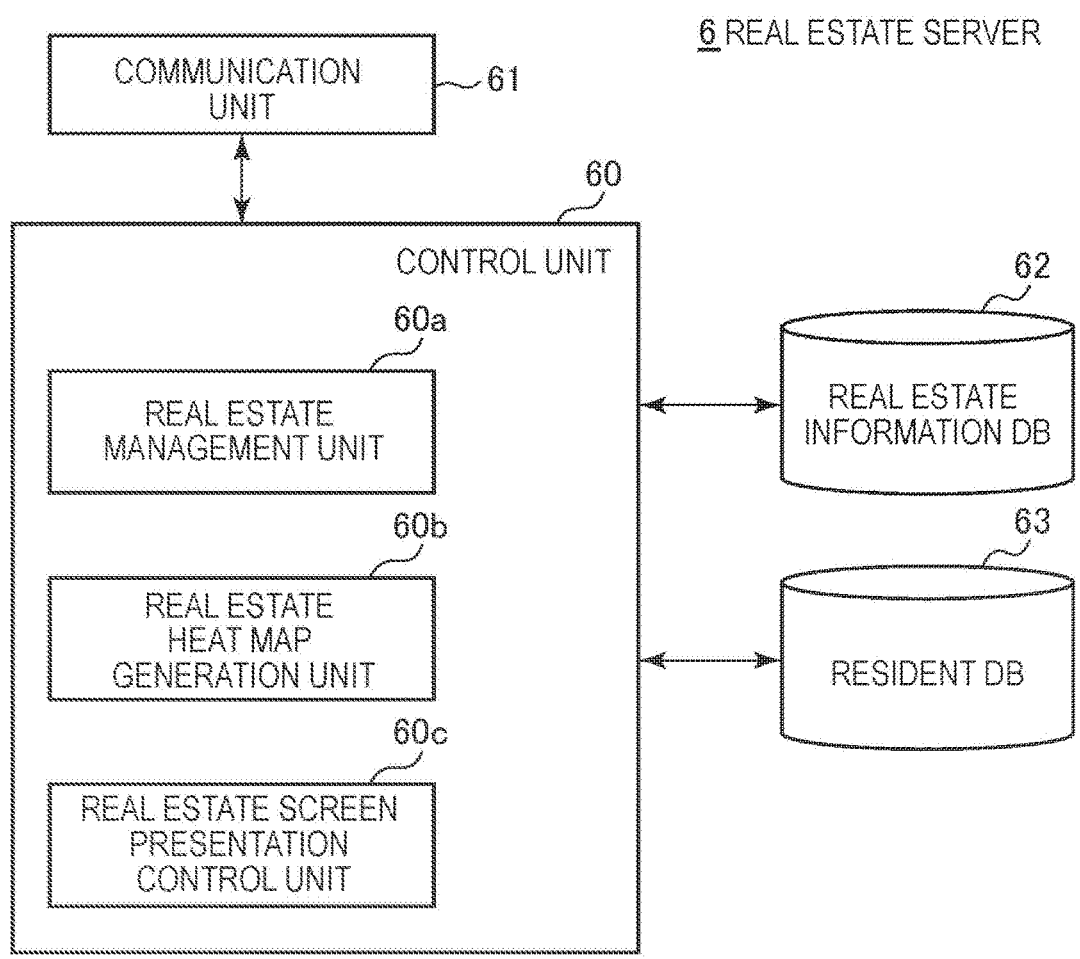
FIG. 12 is a block diagram showing an example of a configuration of a real estate server according to a second embodiment.

FIG. 12 is a block diagram showing an example of a configuration of the real estate server 6 according to the second embodiment. As shown in FIG. 12, the real estate server 6 includes a control unit 60, a communication unit 61, a real estate information DB 62, and a resident DB 63.

(Control Unit)

The control unit 60 controls each of components of the real estate server 6. The control unit 60 is realized by a microcomputer including a CPU, a ROM, a RAM, and a non-volatile memory. Further, as shown in FIG. 12, the control unit 60 also functions as a real estate management unit 60*a*, a real estate heat map generation unit 60*b*, and a real estate screen presentation control unit 60*c*.

The real estate management unit 60*a* performs management (registration, change, and deletion) of real estate leasing or purchase and sale information. More specifically, the real estate management unit 60*a* receives real estate information such as information about a management number, an address, or a resident (an occupant) as information relating to real estate leasing, or purchase and sale of a detached house, an apartment, or the like from the user terminal 3, and stores the information in the real estate information DB 62. In this embodiment, the user terminal 3 may be a communication terminal handled by a realtor who inputs leasing or purchase and sale information or may be a communication terminal on a customer side used when a customer who is considering real estate leasing or purchase and sale as reference information.

Further, the real estate management unit 60*a* changes or deletes the real estate information stored in the real estate information DB 62 in accordance with a change instruction or a deletion instruction from the user terminal 3.

The real estate heat map generation unit 60*b* generates a real estate heat map included in a real estate screen. Specifically, the real estate heat map generation unit 60*b* extracts a piece of real estate in which an occupant is already living with reference to the real estate information DB 12, and extracts an object ID associated with a resident ID of a person who occupies the piece of real estate from the resident DB 13 on the basis of the resident ID. Then, the real estate heat map generation unit 60*b* makes an inquiry to the sensitivity server 2 using the extracted object ID and acquires a sensitivity value of the object (that is, the person who is occupying the piece of real estate). Then, the real estate heat map generation unit 60*b* generates a real estate heat map, in which the sensitivity value of the person who is occupying the piece of real estate is reflected, so that a user can intuitively and easily recognize the acquired sensitivity value of each person who occupies a piece of real estate. For example, the real estate heat map generation unit 60*b* may color-classify pieces of real estate depending on sensitivity values, and may represent heights of the sensitivity values according to differences between densities or colors.

The real estate screen presentation control unit 60*c* has a function of performing control for generating a real estate screen including a real estate heat map generated by the real estate heat map generation unit 60*b* and presenting the real estate screen by the user terminal 3. For example, the real estate screen presentation control unit 60*c* performs control for transmitting control information (also referred to as real estate screen display information) for displaying the real estate screen on the user terminal 3 through the communication unit 61.

(Communication Unit)

The communication unit 61 performs transmission and reception of data with an external device. For example, the communication unit 61 is connected to the sensitivity server 2 to receive a sensitivity value associated with an object ID, or is connected to the user terminal 3 to transmit real estate screen display information or to receive real estate information.

(Real Estate Information DB)

The real estate information DB 62 is a storage unit that stores information relating to pieces of real estate. For example, the real estate information DB 62 stores real estate information such as information about a management number, an address, or a resident (an occupant).

(Resident DB)

The resident DB 63 is a storage unit that stores information (a resident ID, a name, a gender, an address, an e-mail address, and the like) relating to a resident (that is, an occupant) of a piece of real estate and an object ID associated with the resident ID.

The configuration of the real estate server 6 has been specifically described above. The configuration of the real estate server 6 shown in FIG. 12 is an example, and the configuration of the real estate server 6 according to this embodiment is not limited thereto. For example, a storage unit such as the real estate information DB 62 or the resident DB 63 may be stored in an external device on a network.

3-2. Operation Process

Figure 13:
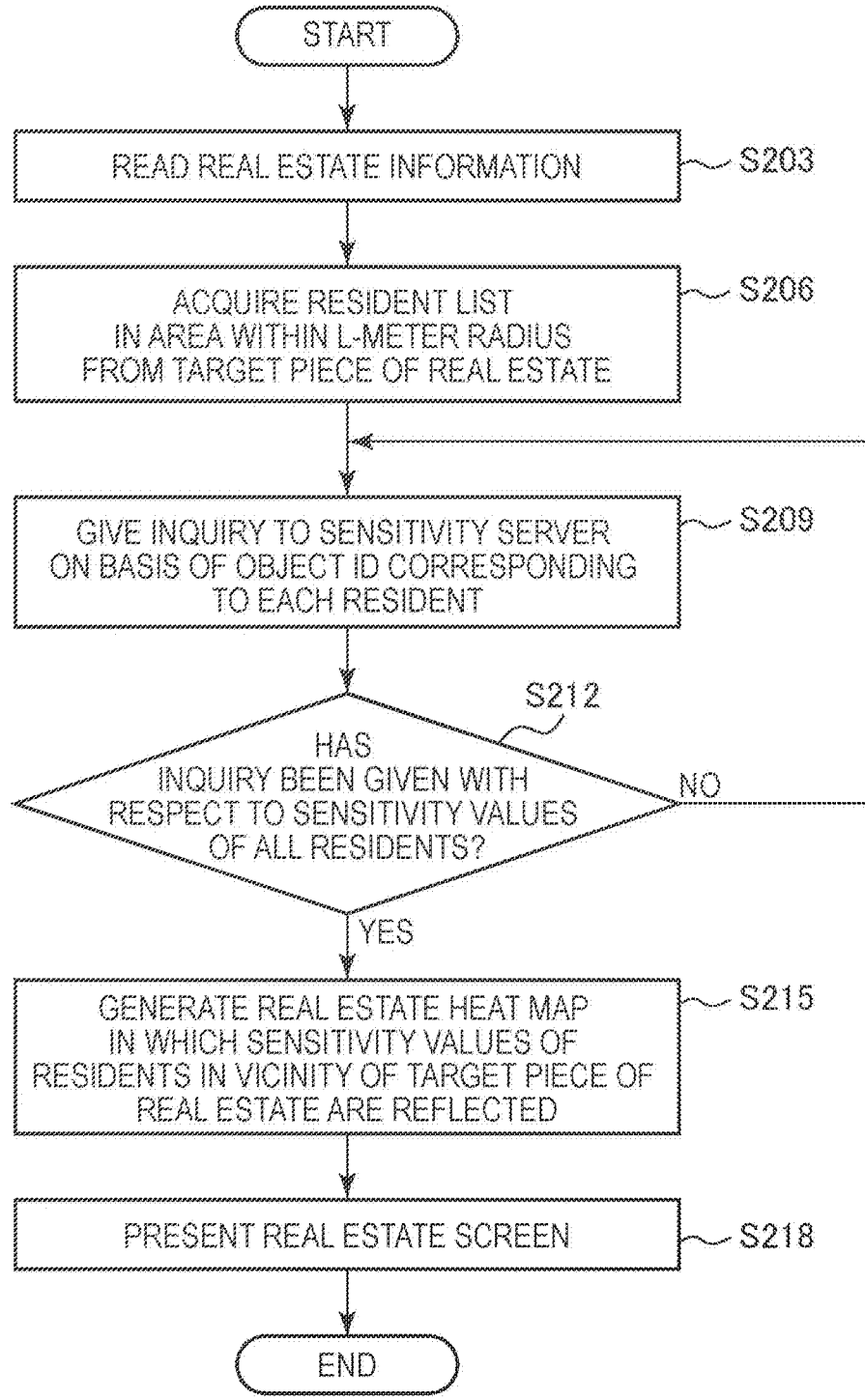
FIG. 13 is a flowchart illustrating a real estate screen presentation process according to the second embodiment.

Next, an operation process according to this embodiment will be described with reference to FIG. 13. FIG. 13 is a flowchart illustrating a real estate screen presentation process according to the second embodiment.

As shown in FIG. 13, in step S203, the real estate heat map generation unit 60*b* reads real estate information from the real estate information DB 62 according to an access from the user terminal 3.

Then, in step S206, the real estate heat map generation unit 60*b* acquires a resident list in an area within an L-meter radius from a target piece of real estate on the basis of the real estate information.

Then, in step S209, the real estate heat map generation unit 60*b* converts all acquired resident IDs into object IDs with reference to the resident DB 63, and makes an inquiry to the sensitivity server 2 about sensitivity values of the object IDs (that is, sensitivity values of residents). A case in which the real estate server 6 has a sensitivity value of an object ID, which has already been acquired, may be excluded.

Subsequently, if the inquiry regarding the sensitivity values of all the residents is terminated ("Yes" in S212), in step S215, the real estate heat map generation unit 60*b* generates a real estate heat map in which sensitivity values of residents surrounding the target piece of real estate are reflected.

Figure 14:
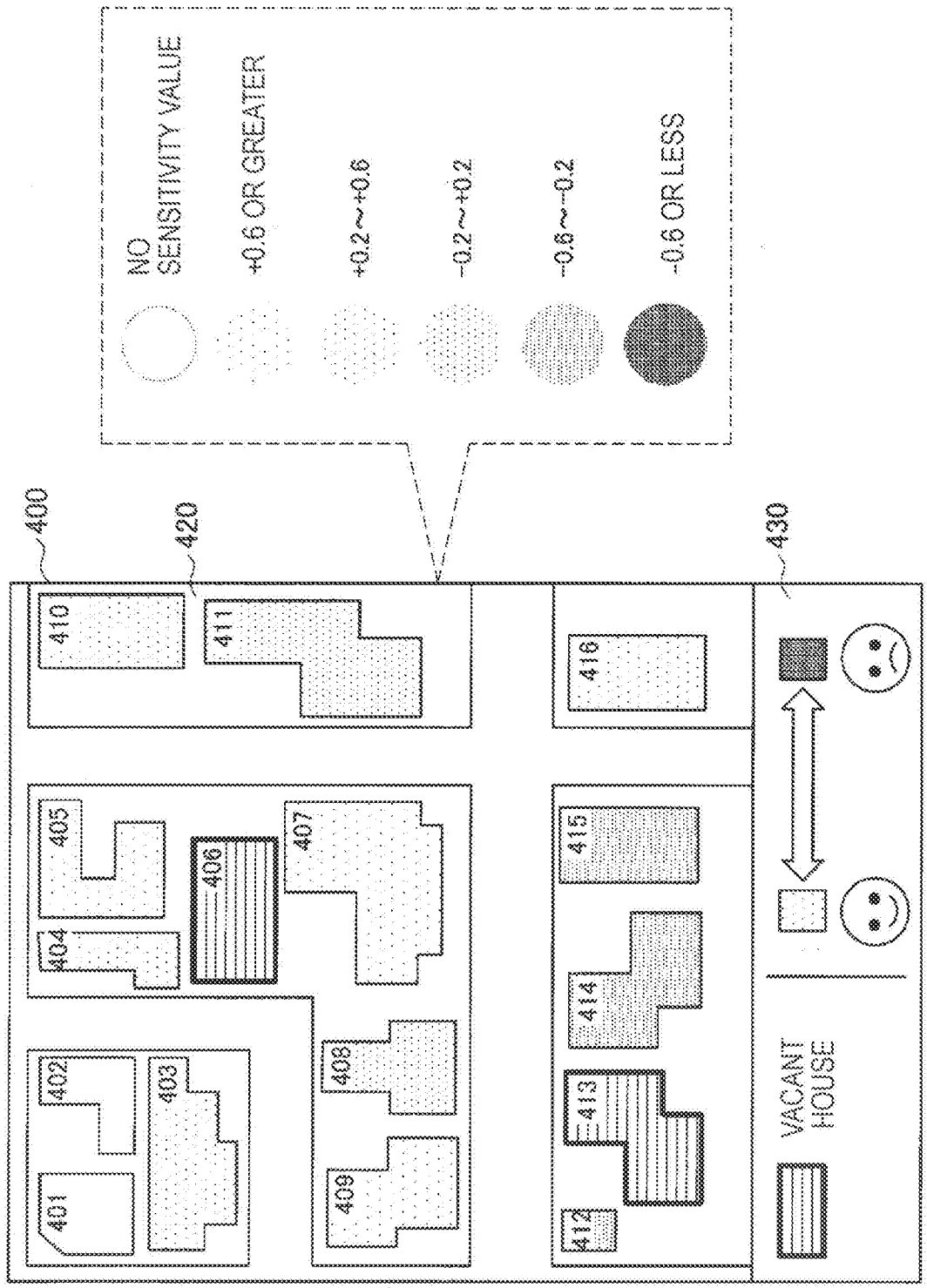
FIG. 14 is a diagram showing an example of a real estate screen including a real estate heat map, in which sensitivity values of residents are reflected, according to the second embodiment.

Finally, in step S218, the real estate screen presentation control unit 60*c* performs control for presenting a real estate screen including the real estate heat map to the user terminal 3. Here, FIG. 14 is a diagram showing an example of a real estate screen including a real estate heat map in which sensitivity values of residents are reflected. As shown in FIG. 14, a real estate screen 400 includes a real estate heat map 420, in which sensitivity values are reflected, and a legend display 430.

As shown in FIG. 14, colors depending on sensitivity values of residents are given to pieces of real estate in which the residents are currently living. Specifically, for example, a sensitivity value becomes lower as a color given to a piece of real estate darkens, and becomes higher as the color lightens. In a case in which a plurality of residents live in a plurality of residences, an average of the plurality of residents may be employed. Further, in a case in which a sensitivity value of a desired object ID cannot be acquired from the sensitivity server 2, no color may be given as no sensitivity value.

With this configuration, for example, when considering leasing or purchase or sale of a piece of a real estate, a user can refer to sensitivity values of residents who live in the vicinity thereof in addition to attributes of the piece of real estate (azimuth, sunshine time, ground properties, convenience of neighboring commercial facilities, or convenience of transportation facilities such as a station). For example, in the example shown in FIG. 14, a piece of real estate 406 and a piece of real estate 413 are vacant houses, in which sensitivity values of pieces of real estate that surround the real estate 406 are lower than sensitivity values of pieces of real estate that surround the real estate 413. Accordingly, in order to avoid bad public security and neighbor troubles, a user can determine that there is a high possibility that living in the piece of real estate 406 is more comfortable.

4. Third Embodiment

Selection of a specific space according to the present disclosure is not limited to the selection of the above-described seat or piece of real estate, and, for example, a selection of a parking place in a parking lot may be considered. For example, when searching for a parking place in a parking lot, convenience after parking such as a place close to an entrance of a store or a place close to an elevator may be considered, and if a user can additionally consider what kind of person a driver of another vehicle which has been already parked around him or her is, the user can more comfortably park his or her vehicle.

For example, in a case in which a driver of a vehicle which has already parked in an adjacent section is a person who is very rough, a person who is easily angered, a person who is very angry during parking, or the like, a user can consider a possibility that the driver may mistakenly operate the vehicle and collide with an adjacent vehicle parked in the adjacent section when starting his or her vehicle, may roughly open a door and collide with the adjacent vehicle, may kick the adjacent vehicle, or may intentionally scratch the adjacent vehicle, for example.

Accordingly, in this embodiment, when a user parks a vehicle, it is possible to realize a selection system that avoids an accident or trouble in advance by presenting a parking lot screen including a vehicle heat map in which emotion of a driver of a vehicle in the vicinity of a parking section of the user is reflected. Hereinafter, an overall configuration of this embodiment will be described with reference to FIG. 15.

Figure 15:
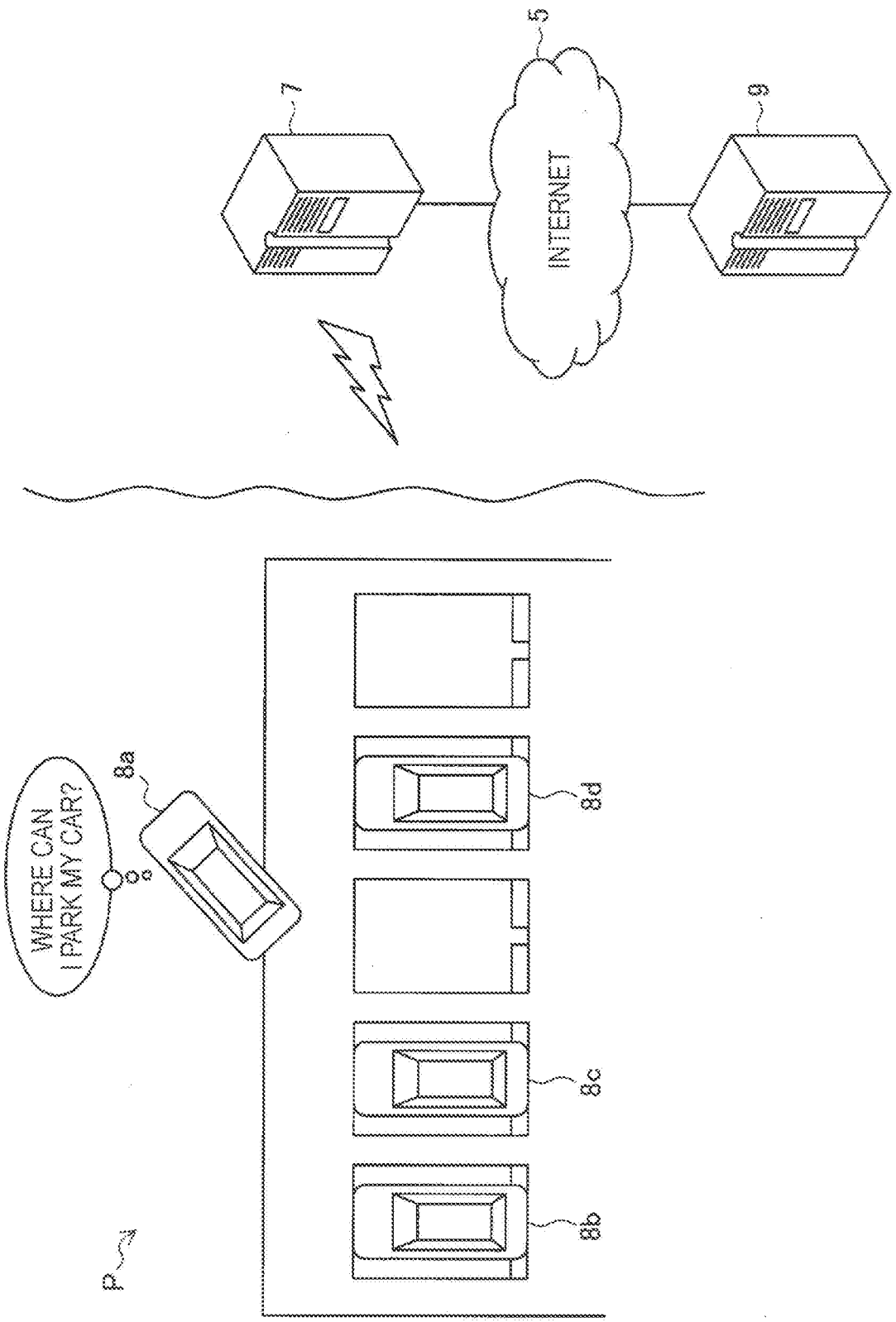
FIG. 15 is a diagram showing an overall configuration of an information processing system according to a third embodiment.

FIG. 15 is a diagram showing an overall configuration of an information processing system according to the third embodiment. As shown in FIG. 15, the information processing system according to the third embodiment includes a parking management server 7 connected to vehicles 8b to 8d which are parked at a parking lot P, a vehicle 8a driven by a user, and an emotion cloud server 9 connected to the parking management server 7 through the Internet 5.

The user who drives the vehicle 8a selects a parking section with reference to a parking lot screen presented from the parking management server 7 when considering a place at which the vehicle is to be parked at the parking lot P. The parking lot screen includes a vehicle heat map, in which emotion information of drivers of the vehicles 8b to 8d which have already parked is reflected, and thus, the user can park the vehicle while avoiding places next to vehicles driven by rough people or people with bad moods. The emotion information of the drivers of each of vehicles may be acquired, for example, from the emotion cloud server 9. Here, the emotion information of each driver accumulated in the emotion cloud server 9 may be biological information or the like of each driver, which is received by the parking management server 7 from the vehicle 8 when the driver stops the vehicle at the parking lot P, and is temporarily accumulated in the emotion cloud server 9. Such a vehicle heat map, in which emotion information of a driver of another vehicle which has already been parked is reflected, will be described later with reference to FIG. 19.

Subsequently, configurations of each device included in the information processing system according to this embodiment will be specifically described with reference to FIGS. 16 to 17.

4-1. Configuration (4-1-1. Configuration of Parking Management Server 7)

Figure 16:
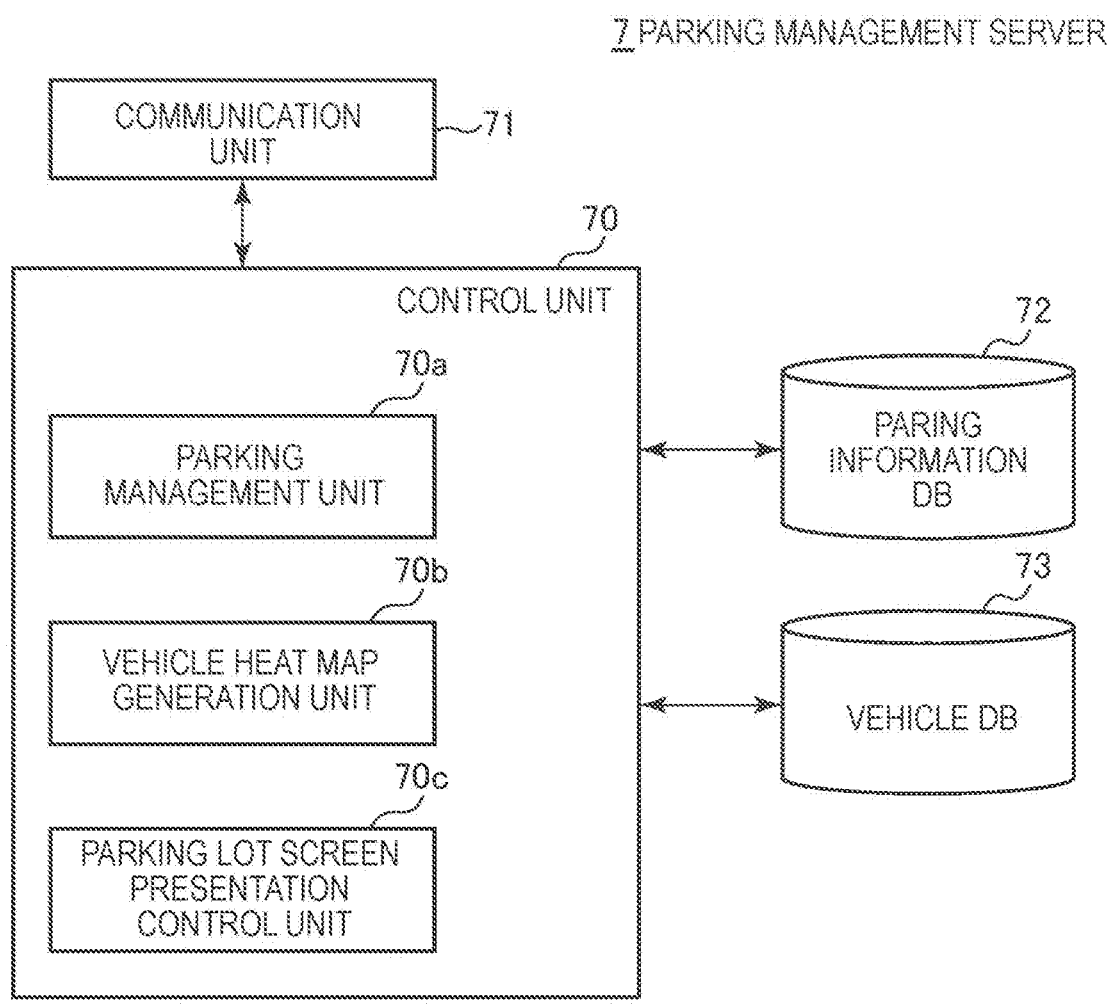
FIG. 16 is a block diagram showing an example of a configuration of a parking management server according to the third embodiment.
Figure 17:
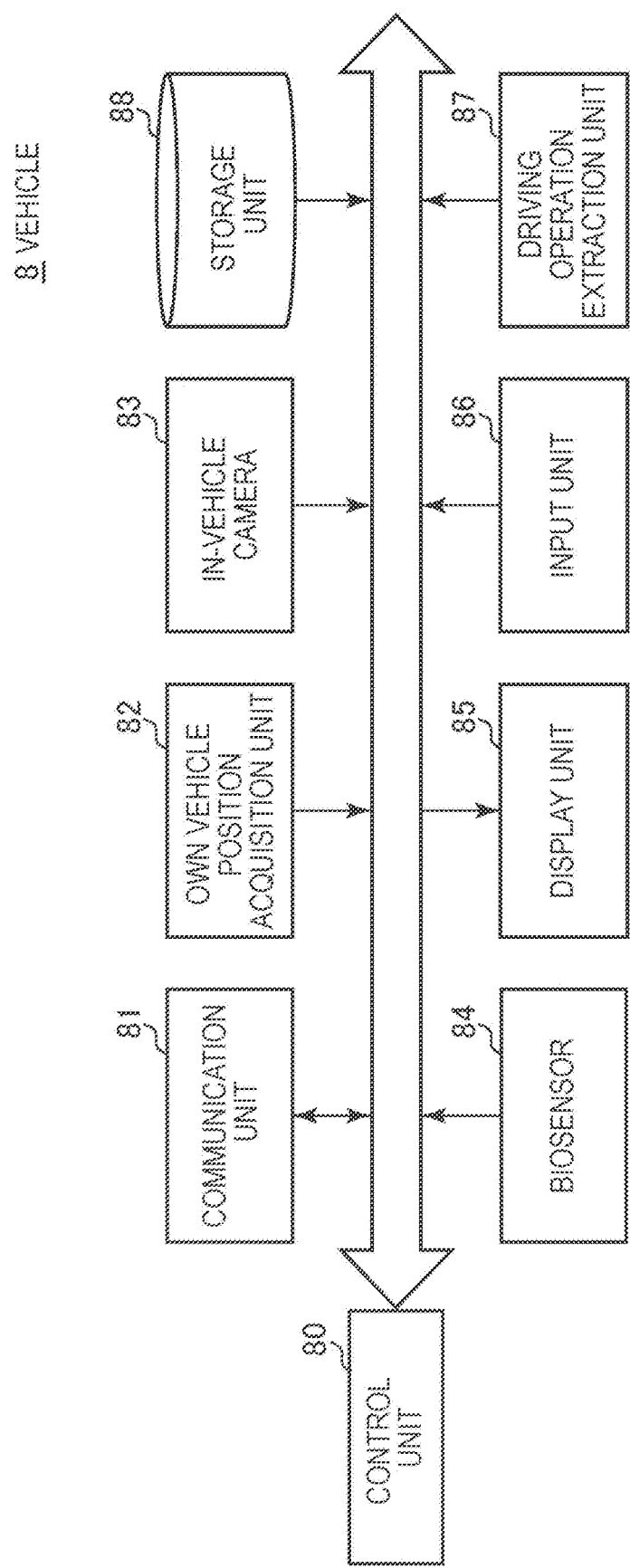
FIG. 17 is a block diagram showing an example of a configuration of a vehicle according to the third embodiment.

FIG. 16 is a block diagram showing an example of a configuration of the parking management server 7 according to this embodiment. As shown in FIG. 16, the parking management server 7 includes a control unit 70, a communication unit 71, a parking information DB 72, and a vehicle DB 73.

(Control Unit)

The control unit 70 controls each of components of the parking management server 7. The control unit 70 is realized by a microcomputer including a CPU, a ROM, a RAM, and a non-volatile memory. In addition, the control unit 70 according to this embodiment also functions as a parking management unit 70a, a vehicle heat map generation unit 70b, and a parking lot screen presentation control unit 70c, as shown in FIG. 16.

The parking management unit 70a performs management (registration, change, and deletion) of information of a vehicle which is parked at a parking lot. More specifically, the parking management unit 70a receives information such as a parking position (a parking section number) or identification information (a vehicle number, an identification code, attitude information, or the like) of a parked vehicle from a monitoring camera or various sensors provided in the vehicle 8 or the parking lot P (for example, a stopped car sensor, a number reader camera, or the like provided in each parking section) as parking information when the vehicle is parked, and stores the parking information in the parking information DB 72. Further, the parking management unit 70a may acquire emotion information of a driver from the monitoring camera provided in the vehicle 8 or the parking lot P while parking, and may store the emotion information in the parking information DB 72 or the emotion cloud server 9. Particularly, a facial expression obtained from an internal camera provided in the vehicle 8 or the monitoring camera provided at the parking lot P serves as an important factor for recognizing the emotion of the driver. Further, biological information (pulse, perspiration, breathing rate, unconscious utterance, or the like) acquired from a biosensor provided in a steering wheel or the like of the vehicle 8 or a biosensor worn by the driver also serves as a factor for recognizing the emotion of the driver. In addition, driving operation information (steering wheel operation or brake operation) of the vehicle 8 also serves as a factor for recognizing the emotion of the driver, such as flustered, irritated, or calm.

Further, in a case in which a vehicle which is stopped starts moving, the parking management unit 70a deletes parking information about the vehicle from the parking information DB 72.

The vehicle heat map generation unit 70b generates a vehicle heat map included in a parking lot screen. Specifically, the vehicle heat map generation unit 70b extracts a vehicle-parked section number with reference to the parking information DB 72 and extracts an object ID associated with a user ID of a driver of a vehicle from the vehicle DB 73. Then, the vehicle heat map generation unit 70b makes an inquiry to the emotion cloud server 9 using the extracted object ID, and acquires emotion information of an object (that is, the driver). Such emotion information also includes emotion information (that is, emotion information after parking, which may be recognized in time series) estimated from a result obtained by tracking a behavior of the driver after he or she has gotten out of the vehicle, in addition to emotion information (that is, emotion information during parking) of the driver acquired by the parking management server 7 while the vehicle is being parked. For example, the emotion information of the driver after he or she has gotten out of the vehicle may be acquired from biological information acquired by a biosensor worn by the driver even after the driver has gotten out of the vehicle or from images captured by a monitoring camera provided in a building or the like. Further, the emotion information may include a sensitivity value used in the first and second embodiments. The emotion cloud server 9 according to this embodiment has a configuration including an emotion information DB in addition to the configuration of the sensitivity server 2 shown in FIG. 4, and the emotion information DB temporarily stores emotion information of the driver transmitted from the parking management server 7.

The vehicle heat map generation unit 70b generates a vehicle heat map in which the acquired emotion information of the driver of the parked vehicle is reflected so that a user intuitively and easily recognizes the emotion information. For example, the vehicle heat map generation unit 70b color-classifies parking sections depending on emotion information, and may express the level of emotion (angriness, calmness, or the like) due to differences between densities or colors.

The parking lot screen presentation control unit 70c has a function of performing control for generating a parking lot screen including a vehicle heat map generated by the vehicle heat map generation unit 70b and presenting the parking lot screen to the display unit 85 (for example, a portion in which a car navigation screen is displayed) of the vehicle 8. For example, the parking lot screen presentation control unit 70c performs control for transmitting control information (also referred to as parking lot screen display information) for displaying the parking lot screen to the vehicle 8 from the communication unit 71.

(Communication Unit)

The communication unit 71 performs transmission and reception of data with an external device. For example, the communication unit 71 is connected to the emotion cloud server 9 to receive emotion information corresponding to an object ID or is connected to the vehicle 8 to transmit parking lot screen display information or to receive parking information.

(Parking Information DB)

The parking information DB 72 is a storage unit that stores information relating to a vehicle which is parked at a parking section. For example, the parking information DB 72 stores information such as a parking position (a parking section number) and identification information (a vehicle number, an identification code, attribute information, or the like) of the parked vehicle.

(Vehicle DB)

The vehicle DB 13 is a storage unit that stores information relating to parked vehicles. The information relating to the parked vehicles includes identification information of the parked vehicles, user IDs of the drivers of the parked vehicles, object IDs corresponding to the user IDs, or the like.

The configuration of the parking management server 7 has been specifically described above. The configuration of the parking management server 7 shown in FIG. 16 is an example, and the configuration of the parking management server 7 according to this embodiment is not limited thereto. For example, a storage unit such as the parking information DB 72 or the vehicle DB 73 may be stored in an external storage device on a network.

(4-1-2. Configuration of Vehicle 8)

Next, a configuration of the vehicle 8 will be described with reference to FIG. 17. As shown in FIG. 17, the vehicle 8 includes a control unit 80, a communication unit 81, an own vehicle position acquisition unit 82, an in-vehicle camera 83, a biosensor 84, a display unit 85, an input unit 86, a driving operation extraction unit 87, and a storage unit 88.

The control unit 80 is configured by, for example, a microcomputer including a CPU, a ROM, a RAM, a nonvolatile memory, and an interface unit, and controls each of components of the vehicle 8. Further, when the vehicle is stopped at the parking lot P, the control unit 80 performs control for transmitting own vehicle position information acquired by the own vehicle position acquisition unit 82, a face image of a driver captured by the in-vehicle camera 83, and biological information of the driver detected by the biosensor 84, according to a request from the parking management server 7. Further, the control unit 80 performs control for transmitting driver information (a name, an age, a gender, an address, a user ID, an object ID, or the like) input in advance from the input unit 86 and stored in the storage unit 88 according to the same request, and driving operation information (steering wheel operation, brake operation, accelerator operation, or the like) extracted by the driving operation extraction unit 87.

The communication unit 81 performs transmission and reception of data with an external device. For example, the communication unit 81 is connected to the parking management server 7 to transmit a face image, biological information, driving operation information, and the like, which are factors for extracting emotion information of the driver, or to receive display information of a parking lot screen in which emotion information of a driver of another vehicle is reflected.

The own vehicle position acquisition unit 82 has a function of detecting a current position of the vehicle 8 on the basis of an external acquisition signal. Specifically, for example, the own vehicle position acquisition unit 82 is realized by a global positioning system (GPS) position measurement unit, receives radio waves from a GPS satellite, detects a position at which the vehicle 8 exists, and outputs information about the detected position to the control unit 80. Further, the own vehicle position acquisition unit 82 may detect the position through transmission or reception through, for example, Wi-Fi (registered trademark) or Bluetooth (registered trademark), or through near field communication, or the like in addition to GPS.

The in-vehicle camera 83 is a camera for capturing the inside of the vehicle 8. For example, the in-vehicle camera 83 is provided to capture the face of the driver, and to include a driver-side seat in an angle of view.

The biosensor 84 has a function of detecting biological information about a user (the driver) who drives the vehicle 8. For example, the biosensor 84 is provided at a steering wheel part of the vehicle 8, and detects a temperature, the amount of perspiration, a heart rate, or the like of the driver.

The display unit 85 is a display unit provided in the vicinity of the driver-side seat of the vehicle 8, and, for example, is realized by a liquid crystal display. The display unit 85 displays a car navigation screen or a parking lot screen transmitted from the parking management server 7. Further, the display unit 85 may be a projection unit that projects an image onto a windshield of the vehicle 8.

The input unit 86 is provided in the vicinity of the driver-side seat of the vehicle 8, and receives an input of an operation of the user. For example, the input unit 86 may be a touch panel overlapping the display unit 85. In addition, the input unit 86 may also have a function of analyzing a voice of the user collected by a microphone for voice input.

The driving operation extraction unit 87 extracts information relating to a driving operation of the vehicle 8 by a driver, such as a steering wheel operation, a brake operation, an accelerator operation, or speed. Thus, it is possible to recognize roughness and niceness of driving, which become a factor for extracting the emotion information of the driver.

The storage unit 88 stores a program for causing the control unit 80 to execute each of processes. Further, the storage unit 88 may also store information (a name, an age, a gender, a user ID, an object ID, or the like) relating to a driver of the vehicle 8.

The specific configuration of the vehicle 8 according to this embodiment has been described above. The configuration of the vehicle 8 shown in FIG. 17 is an example, and this embodiment is not limited thereto. For example, an out-vehicle camera may be provided. The control unit 80 transmits an image captured by the out-vehicle camera to the parking management server 7 so that it is possible to recognize a position of the vehicle 8 in the parking lot P, a number of a vehicle which is stopped in the vicinity thereof or the like through the parking management server 7.

4-2. Operation Process

Figure 18:
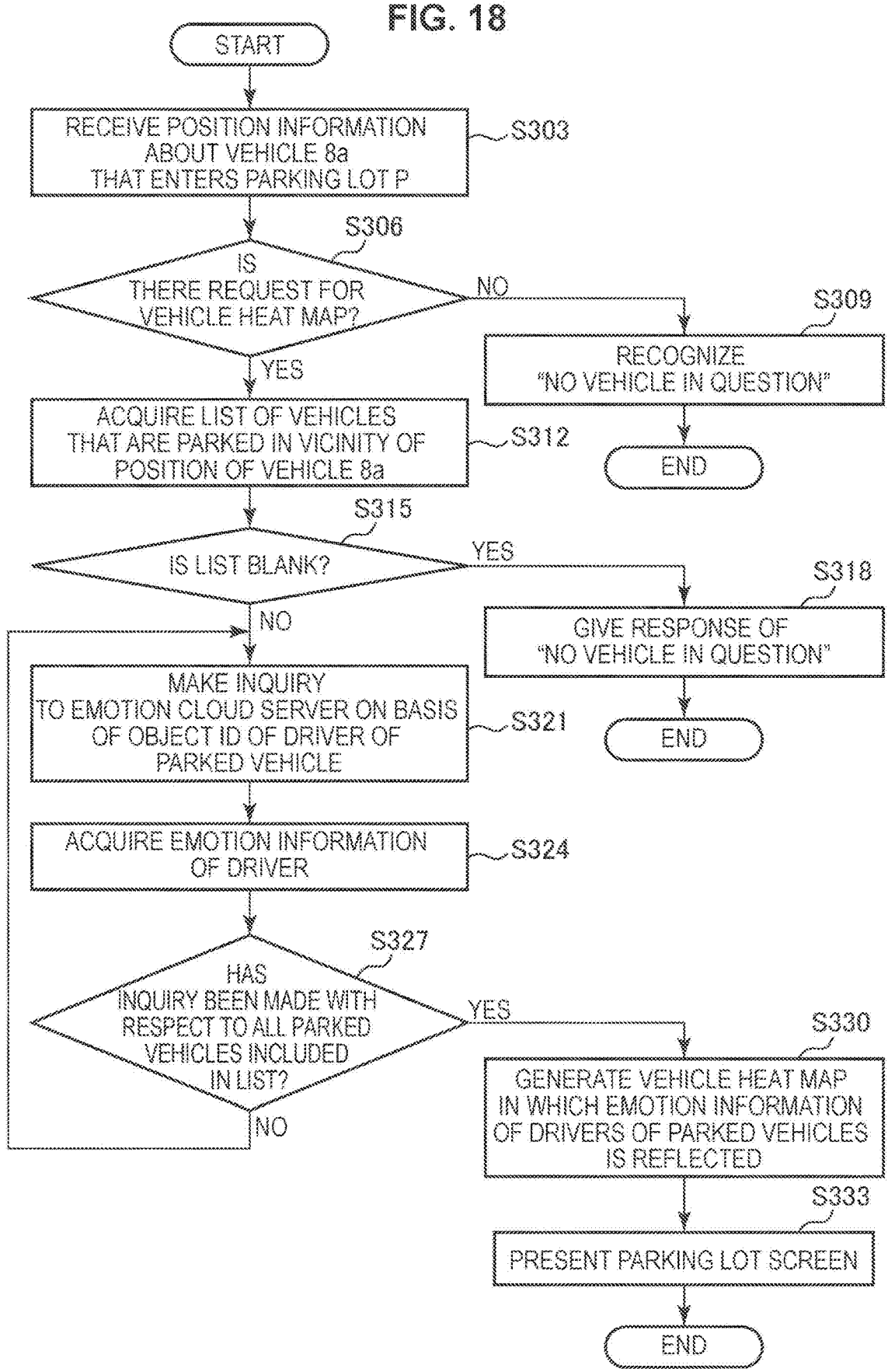
FIG. 18 is a flowchart illustrating a parking lot screen presentation process according to the third embodiment.

Subsequently, an operation process according to this embodiment will be specifically described with reference to FIG. 18. FIG. 18 is a flowchart showing a parking lot screen presentation process according to a third embodiment.

As shown in FIG. 18, in step S303, the parking management server 7 receives position information of a vehicle 8*a* that enters the parking lot P. For example, the parking management server 7 can detect the entrance or a position of the vehicle 8 using a plurality of sensors provided in the parking lot P. Alternatively, the parking management server 7 recognizes the position of the vehicle 8*a* in the parking lot P on the basis of position information acquired by the own vehicle position acquisition unit 82 provided in the vehicle 8*a*.

Then, in a case in which a vehicle heat map generation request is received from the vehicle 8*a* ("Yes" in S306), in step S312, the vehicle heat map generation unit 70*b* acquires a list of vehicles which are parked in the vicinity of the position of the vehicle 8*a* from the parking information DB 72.

On the other hand, in a case in which a vehicle heat map generation request is not received from the vehicle 8*a* ("No" in S306), the paring management server 7 recognizes that the vehicle 8*a* does not correspond to a vehicle that is receiving the present service and terminates the process in S309. The request from the vehicle 8*a* is not essential. That is, the process of step S306 may be skipped, and all vehicles 8*a* that enter the parking lot P may be targets of this service.

Then, in a case in which the vehicle list acquired from the parking information DB 72 is blank ("Yes" in S315), in step S318, the control unit 70 of the parking management server 7 gives a response of "no vehicle in question" (no vehicle that is parked in the vicinity thereof) to the vehicle 8*a*.

Then, in a case in which the vehicle list is not blank ("No" in S315), in step S321, the vehicle heat map generation unit 70*b* makes an inquiry to the emotion cloud server 9 on the basis of an object ID corresponding to a driver of a parked vehicle about emotion information of the driver with reference to the vehicle DB 73.

Then, the vehicle heat map generation unit 70*b* receives the emotion information of the driver of the parked vehicle from the emotion cloud server 9.

Subsequently, if the inquiry to the emotion cloud server 9 is made with respect to all parked vehicles included in the list ("Yes" in S327), in step S330, the vehicle heat map generation unit 70*b* generates a vehicle heat map in which the emotion information of drivers of the parked vehicles is reflected.

Figure 19:
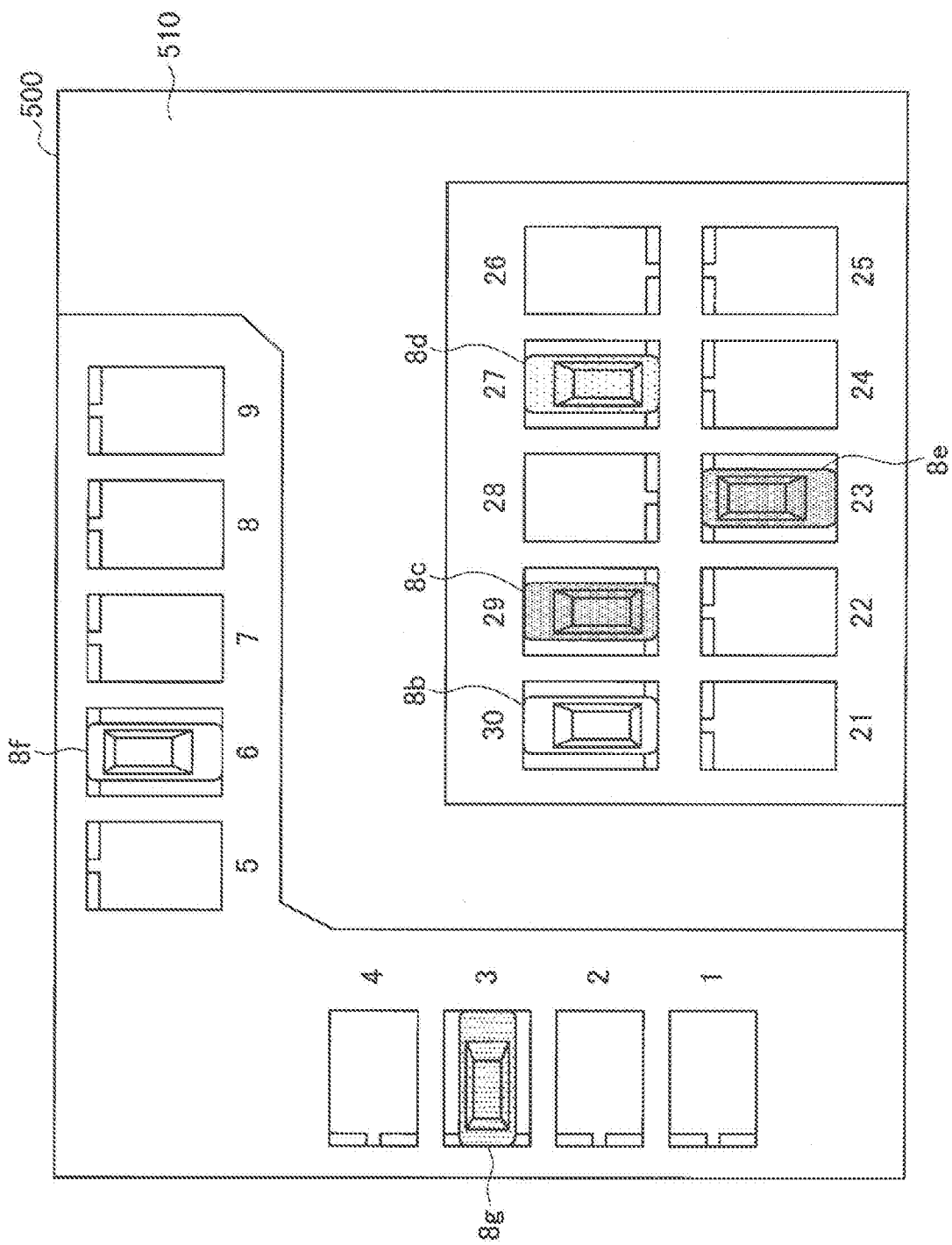
FIG. 19 is a diagram showing an example of the parking lot screen according to the third embodiment.

Further, in step S333, the parking lot screen presentation control unit 70*c* performs control for presenting a parking lot screen including the vehicle heat map to the vehicle 8*a*. Here, FIG. 19 shows an example of a parking lot screen according to this embodiment. As shown in FIG. 19, a parking lot screen 500 includes a vehicle heat map 510. The vehicle heat map 510 is a schematic diagram of a parking lot, in which color classifications are given to images corresponding to each of the vehicles 8*b* to 8*g* and are disposed to correspond to actual parking positions thereof to have densities based on degrees of emotion information of drivers of each of the vehicles. For example, in a case in which a degree of anger or irritation of a driver is high, a dark color is displayed, and in a case in which the driver is calm, a light color is displayed. Further, the reflected emotion information may be emotion information at the time of parking, or may be sensitivity values based on accumulated interaction evaluations.

Thus, a driver of a vehicle which is to be newly parked can perform a selection for avoiding a parking section 29 where a vehicle 8*c*, which is displayed with a dark color, is parked with reference to the vehicle heat map 510, or a parking section 23 where a vehicle 8*e*, which is displayed with the same density is parked, and can park the vehicle with comfort.

The third embodiment has been specifically described above. In the above-described embodiment, a case in which the parking lot screen 500 including the vehicle heat map 510, in which emotion information of a driver of a parked vehicle is reflected, has been described, but this embodiment is not limited thereto. For example, a parking lot screen including a vehicle heat map in which a level of driving proficiency or skill is reflected may be presented.

Further, a parking lot screen is presented to a driver (a user) to support selection of a parking section by the driver in the above-described embodiments, but this embodiment is not limited thereto. The vehicle 8 may automatically select an optimal parking section on the basis of a vehicle heat map, and may recommend the optimal parking section to the driver.

In addition, generation of a parking lot screen including a vehicle heat map is performed by the parking management server 7 in the above-described embodiments, but this embodiment is not limited thereto. For example, the parking lot screen may be generated by the vehicle 8. Furthermore, the display of a parking lot screen is not limited to the display on the display unit 85 of the vehicle 8. For example, the parking lot screen may be displayed on an information processing terminal such as a smartphone, a mobile phone, a tablet terminal, or a detachable car navigation device owned by a driver of the vehicle 8.

5. Conclusion

As described above, in the information processing system according to the embodiments of the present disclosure, it is possible to more effectively select a specific space unit.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, a ROM, or a RAM provided in the above-described reservation server 1, the sensitivity server 2, the real estate server 6, the parking management server 7, the vehicle 8, or the emotion cloud server 9 to exhibit functions of the reservation server 1, the sensitivity server 2, the real estate server 6, the parking management server 7, the vehicle 8, or the emotion cloud server 9 may be generated. Further, a computer-readable storage medium that stores the computer program is also provided.

Further, the seat price described in the above-described modified example is a price for occupying a specific space, and thus, a change in the seat price may also be applied to a price change in the above-described piece of real estate or parking section.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing system including:
a generation unit that specifies a user who occupies or reserves occupation of a specific space unit in a predetermined area, and generates a heat map in accordance with attribute information about the user; and
a providing unit that provides the heat map as a user interface for the user to select a specific space in the predetermined area.

(2)
The information processing system according to (1), wherein the attribute information about the user is group information indicating that the user is relevant to another user who occupies or reserves occupation of a space that is different from a space occupied or reserved for occupation by the user.

(3)
The information processing system according to (1), wherein the attribute information about the user is information relating to an emotion of the user.

(4)
The information processing system according to (3), wherein the generation unit acquires, as information relating to the emotion of the user, a sensitivity value corresponding to the user registered as an object from a sensitivity value database, which is formed by accumulating sensitivity values of respective objects generated on a basis of information relating to an interaction between the objects.

(5)
The information processing system according to (3), wherein the generation unit acquires biological information of the user as information relating to the emotion of the user.

(6)
The information processing system according to any one of (1) to (5),
wherein the specific space unit is a seat unit.

(7)
The information processing system according to any one of (1) to (5),
wherein the specific space unit is a real estate unit.

(8)
The information processing system according to (7),
wherein the specific space unit is a detached house unit.

(9)
The information processing system according to (7),
wherein the specific space unit is a housing unit in an apartment.

(10)
The information processing system according to any one of (1) to (5),
wherein the specific space unit is a parking section unit in a parking lot.

(11)
The information processing system according to any one of (1) to (10),
wherein the providing unit adaptively changes and provides a price necessary for occupying the specific space in accordance with the heat map of a space surrounding the specific space.

(12)
The information processing system according to any one of (1) to (11),
wherein the generation unit generates a heat map expressed as color classifications or color densities according to the attribute information about the user.

(13)
A control method including:
specifying a user who occupies or reserves occupation of a specific space unit in a predetermined area, and generating a heat map in accordance with attribute information about the user; and
providing the heat map as a user interface for the user to select a specific space in the predetermined area.

REFERENCE SIGNS LIST

1 reservation server
10 control unit
10*a* reservation management unit
10*b* seat heat map generation unit
10*c* reservation screen presentation control unit 11 communication unit
12 seat reservation information DB
13 user DB
2 sensitivity server
3 user terminal
5 Internet
6 real estate server
60 control unit
60a reservation management unit
60b seat heat map generation unit
60c reservation screen presentation control unit
61 communication unit
62 real estate information DB
63 resident DB
7 control unit
70a parking management unit
70b vehicle heat map generation unit
70c parking lot screen presentation control unit
71 communication unit
72 parking information DB
73 vehicle DB
8, 8a to 8g vehicle
80 control unit
81 communication unit
82 own vehicle position acquisition unit
83 in-vehicle camera
84 biosensor
85 display unit
86 input unit
87 driving operation extraction unit
88 storage unit
300 reservation screen
310, 330
seat heat map
400 real estate screen
420 real estate heat map
500 parking lot screen
510 vehicle heat map

What is claimed is:

1. An information processing system, comprising:
a plurality of sensors that includes a biosensor in a steering wheel associated with a first user;
circuitry configured to:
control detection, by the biosensor in the steering wheel, of biological information associated with the first user, wherein the biological information includes at least one of a breathing rate of the first user, a pulse rate of the first user, or a perspiration rate of the first user; and
control extraction of driving operation information of the first user, wherein the driving operation information includes operation information of at least one of the steering wheel, a brake, or an accelerator;
and
a server configured to:
receive the biological information detected by the biosensor, and the extracted driving operation information;
control storage of the biological information, the driving operation information, and parking information in a database; and
recognize emotion information of the first user based on the received biological information and the extracted driving operation information;
store the emotion information of the first user, and
generate a heat map, in which a plurality of parking sections are color-classified, based on the emotion information of the first user and the parking information, wherein the first user occupies a first parking space in a parking lot;
control generation of a parking-lot screen that includes the generated heat map;
control, based on the generated heat map, display of a user interface of a user device of a second user to display the parking-lot screen that includes the generated heat map, wherein
the second user selects, through the user interface, a second parking space in the parking lot,
the parking information is associated with the first parking space and the second parking space,
the second parking space is different from the first parking space, and
the second user is different from the first user; and
update, based on the selection of the second parking space, the parking information in the database.

2. The information processing system according to claim 1, wherein the server is further configured to:
control a price of the second parking space based on the heat map; and
control display of the price of the second parking space.

3. The information processing system according to claim 1, wherein
the server is further configured to recognize a sensitivity value based on the detected biological information, and
the sensitivity value represents a credibility of the first user.

4. The information processing system according to claim 3, wherein the server is further configured to receive the sensitivity value from a sensitivity server.

5. The information processing system according to claim 3, wherein
the sensitivity value is based on an evaluation value of interactions of the first user with a set of objects, and
each object of the set of objects is in proximity to the first user.

6. The information processing system according to claim 3, wherein the server is further configured to generate the heat map based on the sensitivity value associated with the first user.

7. The information processing system according to claim 3, wherein the sensitivity value indicates the emotion information associated with the first user.

8. An information processing method, comprising:
in an information processing system that includes circuitry, a server, and a plurality of sensors including a biosensor in a steering wheel associated with a first user:
detecting, by the biosensor in the steering wheel, biological information associated with the first user, wherein the biological information includes at least one of a breathing rate of the first user, a pulse rate of the first user, or a perspiration rate of the first user;
controlling, by the circuitry, extraction of driving operation information of the first user, wherein the driving operation information includes operation information of at least one of the steering wheel, a brake, or an accelerator;
receiving, by the server, the biological information detected by the biosensor, and the extracted driving operation information;
storing, by the server in a database, the biological information, the driving operation information, and parking information;

recognizing, by the server, emotion information of the first user based on the received biological information and the extracted driving operation information, storing, by the server, the emotion information of the first user;

generating, by the server, a heat map, in which a plurality of parking sections are color-classified, based on each of the emotion information of the first user and the parking information, wherein the first user occupies a first parking space in a parking lot;

controlling, by the server, generation of a parking-lot screen that includes the generated heat map;

controlling, by the server, display of a user interface of a user device of a second user to display the parking-lot screen that includes the heat map, wherein the second user selects, through the user interface, a second parking space in the parking lot, the parking information is associated with the first parking space and the second parking space, the second parking space is different from the first parking space, and the second user is different from the first user; and updating, by the server, the parking information in the database based on the selection of the second parking space.

9. The information processing method according to claim 8, further comprising:

controlling, by the server, a price of the second parking space based on the heat map; and controlling, by the server, display of the price of the second parking space.

10. The information processing method according to claim 8, further comprising recognizing, by the server, a sensitivity value based on the detected biological information, wherein the sensitivity value represents a credibility of the first user.

11. The information processing method according to claim 10, further comprising receiving, by the server, the sensitivity value from a sensitivity server.

12. The information processing method according to claim 10, wherein the sensitivity value is based on an evaluation value of interactions of the first user with a set of objects, and each object of the set of objects is in proximity to the first user.

13. The information processing method according to claim 10, further comprising generating, by the server, the heat map based on the sensitivity value associated with the first user.

14. The information processing method according to claim 10, wherein the sensitivity value indicates emotional information associated with the first user.

15. A non-transitory computer-readable medium having stored thereon, computer-executable instructions which, when executed by a computer, cause the computer to execute operations, the operations comprising:

controlling, by circuitry, detection of biological information by a biosensor in a steering wheel associated with a first user, wherein the biological information is associated with the first user, and wherein the biological information includes at least one of a breathing rate of the first user, a pulse rate of the first user, or a perspiration rate of the first user;

controlling, by the circuitry, extraction of driving operation information of the first user, wherein the driving operation information includes operation information of at least one of the steering wheel, a brake, or an accelerator;

receiving, by a server, the biological information detected by the biosensor, and the extracted driving operation information;

storing, by the server, the biological information, the driving operation information, and parking information in a database;

recognizing, by the server, emotion information of the first user based on the received biological information and the extracted driving operation information, storing, by the server, the emotion information of the first user in the server;

generating, by the server, a heat map, in which a plurality of parking sections are color-classified, based on each of the emotion information and the parking information, wherein the first user occupies a first parking space in a parking lot;

controlling, by the server, generation of a parking-lot screen that includes the generated heat map;

controlling, by the server, a display of a user interface of a user device of a second user to display the parking-lot screen that includes the heat map, wherein the second user selects, through the user interface, a second parking space in the parking lot, the parking information is associated with the first parking space and the second parking space, the second parking space is different from the first parking space, and the second user is different from the first user; and updating, by the server, the parking information in the database based on the selection of the second parking space.

* * * * *